US012589821B2

(12) United States Patent
Jin et al.

(10) Patent No.: US 12,589,821 B2
(45) Date of Patent: Mar. 31, 2026

(54) ELECTRIC MOTORCYCLE

(71) Applicant: Zhejiang CFMOTO Power Co., Ltd., Hangzhou (CN)

(72) Inventors: Yuqiang Jin, Hangzhou (CN); Xiaodong Zheng, Hangzhou (CN); Kun Li, Hangzhou (CN); Jifeng Gao, Hangzhou (CN); Rui Deng, Hangzhou (CN); Tao Chen, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 643 days.

(21) Appl. No.: 18/083,789

(22) Filed: Dec. 19, 2022

(65) Prior Publication Data

US 2023/0166805 A1 Jun. 1, 2023

Related U.S. Application Data

(63) Continuation of application No. PCT/CN2020/142586, filed on Dec. 31, 2020.

(30) Foreign Application Priority Data

Nov. 10, 2020 (CN) ......................... 202022590643.X

(51) Int. Cl.
 *B62J 43/16* (2020.01)
 *B60L 53/16* (2019.01)
 (Continued)

(52) U.S. Cl.
 CPC .............. *B62J 43/16* (2020.02); *B60L 53/16* (2019.02); *B62J 41/00* (2020.02); *B62J 43/28* (2020.02);
 (Continued)

(58) Field of Classification Search
 CPC ... B62J 43/16; B62J 41/00; B62J 43/28; B62J 50/30; B62J 1/28; B62J 9/23; B62J 25/06;
 (Continued)

(56) References Cited

U.S. PATENT DOCUMENTS 5,025,883 A 6/1991 Morinaka et al.
7,913,793 B2 3/2011 Kofuji
 (Continued)

FOREIGN PATENT DOCUMENTS

CN 101193530 A 6/2008
CN 101498358 A 8/2009
 (Continued)

OTHER PUBLICATIONS

WO-2020188706-A1 translation, 2020.*
 (Continued)

*Primary Examiner* — Drew J Brown
(74) *Attorney, Agent, or Firm* — Shewchuk IP Services, LLC; Jeffrey D. Shewchuk

(57) ABSTRACT

An electric motorcycle includes a battery pack, a controller and a charging device arranged in sequence along the height direction of the frame. The battery pack and the charging device are positioned on the frame adjacent to the front wheel. The rear suspension comprises a rear fork and a shock absorber connected to the frame by a shaft, the rear fork is connected to the rear wheel, and the electric motor is arranged on the rear fork. The center of gravity of the electric motorcycle is lower. The electric motorcycle can run stably even at a speed of 120 km/h.

20 Claims, 27 Drawing Sheets

(51) Int. Cl.

| | |
|---|---|
| *B62J 41/00* | (2020.01) |
| *B62J 43/28* | (2020.01) |
| *B62J 50/30* | (2020.01) |
| *H01M 10/613* | (2014.01) |
| *H01M 10/625* | (2014.01) |
| *H01M 10/6551* | (2014.01) |
| *H01M 10/6563* | (2014.01) |
| *H01M 10/6568* | (2014.01) |

(52) U.S. Cl.
CPC ........... *B62J 50/30* (2020.02); *H01M 10/613* (2015.04); *H01M 10/625* (2015.04); *H01M 10/6551* (2015.04); *H01M 10/6563* (2015.04); *H01M 10/6568* (2015.04)

(58) Field of Classification Search
CPC ....... B62J 6/027; B62J 6/16; B62J 9/12; B62J 9/30; B62J 15/02; B62J 17/00; B62J 17/04; B62J 23/00; B62J 27/30; B62J 43/20; B62J 45/00; B62J 45/20; B60L 53/16; B60L 50/60; H01M 10/613; H01M 10/625; H01M 10/6551; H01M 10/6563; H01M 10/6568; H01M 2220/20; B60K 11/04; B60K 11/02; B62H 1/04; F16H 55/36; Y02T 10/70; Y02T 10/7072; Y02T 90/14; Y02T 10/64; Y02T 10/72; B62K 11/04; B62K 11/14; B62K 19/28; B62K 19/30; B62K 23/02; B62K 2204/00; B62K 25/283; B62K 11/00; B62M 7/04; B62M 9/02; H02K 9/193; Y02E 60/10
See application file for complete search history.

(56) References Cited

U.S. PATENT DOCUMENTS

| | | | |
|---|---|---|---|
| 10,800,270 | B1 | 10/2020 | Kuo |
| 2002/0038578 | A1 | 4/2002 | Takeyo et al. |
| 2006/0040154 | A1 | 2/2006 | Yoshiyuki et al. |
| 2007/0122671 | A1 | 5/2007 | Shimizu et al. |
| 2008/0236925 | A1 | 10/2008 | Hasegawa et al. |
| 2009/0057046 | A1 | 3/2009 | Kofuji |
| 2010/0078236 | A1 | 4/2010 | Taiki et al. |
| 2012/0080249 | A1* | 4/2012 | Yates, III ............... B60L 50/90 |
| | | | 701/22 |
| 2012/0103716 | A1 | 5/2012 | Fujihara et al. |
| 2013/0220721 | A1 | 8/2013 | Matsuda |
| 2013/0260595 | A1 | 10/2013 | Tamaki et al. |
| 2013/0270022 | A1 | 10/2013 | Matsuda |
| 2013/0299265 | A1 | 11/2013 | Marazzi |
| 2013/0319782 | A1 | 12/2013 | Matsuda |
| 2014/0027193 | A1 | 1/2014 | Annaberger et al. |
| 2014/0263506 | A1 | 9/2014 | Kishi et al. |
| 2014/0284129 | A1 | 9/2014 | Tamura et al. |
| 2014/0305729 | A1 | 10/2014 | Testoni et al. |
| 2014/0345962 | A1 | 11/2014 | Miyashiro |
| 2014/0367183 | A1 | 12/2014 | Matsuda |
| 2015/0314830 | A1 | 11/2015 | Inoue |
| 2015/0329176 | A1 | 11/2015 | Inoue |
| 2016/0056432 | A1 | 2/2016 | Searles |
| 2016/0240900 | A1 | 8/2016 | Nemoto |
| 2019/0322254 | A1 | 10/2019 | Yamada et al. |
| 2019/0329836 | A1 | 10/2019 | Buell |
| 2020/0031420 | A1 | 1/2020 | Aunkst et al. |
| 2020/0269956 | A1 | 8/2020 | Carmignani et al. |
| 2020/0339210 | A1 | 10/2020 | Buell et al. |
| 2020/0398922 | A1 | 12/2020 | Hirose et al. |
| 2021/0001947 | A1 | 1/2021 | Fujikubo et al. |
| 2024/0324149 | A1* | 9/2024 | Reitinger ................ B60K 1/00 |

FOREIGN PATENT DOCUMENTS

| | | | | |
|---|---|---|---|---|
| CN | 2014019640 | Y | 3/2010 | |
| CN | 201694295 | U | 1/2011 | |
| CN | 201756152 | U | 3/2011 | |
| CN | 102107706 | A | 6/2011 | |
| CN | 202444036 | U | 9/2012 | |
| CN | 103155381 | A | 6/2013 | |
| CN | 103209888 | A * | 7/2013 | ............ F16D 51/16 |
| CN | 103423337 | A | 12/2013 | |
| CN | 103707974 | A | 4/2014 | |
| CN | 103946108 | A | 7/2014 | |
| CN | 203769918 | U | 8/2014 | |
| CN | 203844887 | U | 9/2014 | |
| CN | 104443213 | A | 3/2015 | |
| CN | 204956757 | U | 9/2015 | |
| CN | 204978991 | U | 1/2016 | |
| CN | 103889833 | B * | 11/2016 | ............ B60L 50/64 |
| CN | 106184591 | A | 12/2016 | |
| CN | 205837073 | U | 12/2016 | |
| CN | 206563242 | U | 10/2017 | |
| CN | 207000730 | U | 2/2018 | |
| CN | 207078251 | U | 3/2018 | |
| CN | 207145502 | U | 3/2018 | |
| CN | 108331654 | A | 7/2018 | |
| CN | 108463400 | A | 8/2018 | |
| CN | 109050319 | A | 12/2018 | |
| CN | 208233260 | U | 12/2018 | |
| CN | 209159893 | U | 7/2019 | |
| CN | 209225315 | U | 8/2019 | |
| CN | 110228552 | A | 9/2019 | |
| CN | 110606156 | A | 12/2019 | |
| CN | 209938825 | U | 1/2020 | |
| CN | 211869569 | U | 3/2020 | |
| CN | 111232111 | A | 6/2020 | |
| CN | 210822569 | U | 6/2020 | |
| CN | 111422291 | A | 7/2020 | |
| CN | 211055286 | U | 7/2020 | |
| CN | 111867925 | A | 10/2020 | |
| CN | 211869586 | U | 11/2020 | |
| CN | 112623087 | A * | 4/2021 | ........ H01M 10/6568 |
| CN | 220430382 | U * | 2/2024 | ............ B62J 43/23 |
| CN | 119218342 | A * | 12/2024 | ............ B62J 43/16 |
| DE | 102014018911 | A1 | 7/2016 | |
| DE | 112018007389 | B4 * | 10/2024 | ............ H02K 9/19 |
| EP | 0648633 | A1 * | 4/1995 | ............ B62M 7/12 |
| EP | 1496241 | A2 | 1/2005 | |
| EP | 2978659 | A | 2/2016 | |
| EP | 4393802 | A1 * | 7/2024 | ............ B60L 50/64 |
| JP | S54101757 | U | 7/1979 | |
| JP | H05105147 | A * | 4/1993 | ............ B62J 9/18 |
| JP | H09286381 | A | 11/1997 | |
| JP | 2012086689 | A | 5/2012 | |
| JP | 5889422 | B2 | 3/2016 | |
| WO | WO-2012086291 | A1 * | 5/2012 | ............ B60K 11/02 |
| WO | WO-2014054204 | A1 * | 4/2014 | ............ B60L 53/80 |
| WO | WO-2015151262 | A1 * | 10/2015 | ............ B60L 58/15 |
| WO | 2019096680 | A1 | 5/2019 | |
| WO | 20200188706 | A | 9/2020 | |
| WO | WO-2020188706 | A1 * | 9/2020 | ............ B62K 11/10 |

OTHER PUBLICATIONS

WO-2012063291-A1 translation, 2012.*
National Standards of the Peoples Republic of China, GB/T 24158-2009 Electric Motorcycles and Electric Mopeds General Specifications, Jun. 25, 2009.

\* cited by examiner

ELECTRIC MOTORCYCLE

RELATED APPLICATION INFORMATION

The present application is a continuation of PCT/ CN2020/142586 filed on Dec. 31, 2020, which claims the benefits of priority to Chinese Patent Application No. 202022590643.X, filed with the Chinese Patent Office on Nov. 10, 2020. The entire contents of the above-referenced application are incorporated herein by reference.

FIELD OF THE DISCLOSURE

The disclosure relates to the field of electric motorcycles.

BACKGROUND OF THE DISCLOSURE

The electric motorcycle is a type of electric vehicle, which provides electric power stored within a battery pack to an electric motor, and then the electric motor drives the rear wheel of the electric motorcycle to rotate, so that the electric motorcycle can run on the ground.

The Chinese national standard General Technical Conditions for Electric Motorcycles and Electric Mopeds was issued on Jun. 25, 2009 and implemented on Jan. 1, 2010. According to this standard, two or three wheeled vehicles with a maximum design speed of greater than 20 km/h and less than 50 km/h and driven by electricity are called mopeds or electric motorcycles, and electric motorcycles or mopeds are included in the category of motor vehicles.

The maximum speed of the electric motorcycle is below 50 km/h. At this speed, the vibration frequency of the electric motorcycle is small, and the requirements for the vehicle body strength and battery endurance are small. However, when the speed of the electric motorcycle is increased to greater than 50 km/h, the vibration frequency of the electric motorcycle increases, and the requirements for the vehicle body strength and the power storage capacity of the battery are high.

In order to meet the requirements that the speed of the electric motorcycle is greater than 50 km/h, it is necessary to improve the vehicle body strength of the electric motorcycle and the safety and controllability of the electric motorcycle when it runs at the highest speed.

SUMMARY OF THE INVENTION

The object of the disclosure is to provide an electric motorcycle with improved safety when running at a speed of greater than 50 km/h.

An electric motorcycle includes a frame, a front wheel, a rear wheel, a front suspension, a rear suspension, a steering system, an electric motor, a battery pack, a charging device, a controller, a plurality of seats, a dashboard panel, a front fairing, a plurality of lights, a side box, and a vehicle cover. The battery pack, the controller and the charging device are all disposed on the frame. The battery pack provides electric power for the electric equipment on the electric motorcycle, and the charging device converts the electric energy of the public grid into DC to charge the battery pack. The controller is connected to the electric motor by wires, and the controller controls the electric motor.

The battery pack, the controller and the charging device are arranged in sequence along the height direction of the frame. The battery pack and the charging device are positioned on the frame adjacent to the front wheel. The controller is arranged on the battery pack. The electric motorcycle is more compact and the center of gravity of the electric motorcycle is lower. Therefore, the electric motorcycle can run stably even at speeds of up to 120 km/h or more.

The disclosure has the following advantages.

The battery pack, the controller and the charging device are arranged on the frame adjacent to the front wheel. The electric motorcycle has a compact structure and high structural strength. The wind resistance is smaller and the electric motorcycle is safer when the electric motorcycle runs at speeds of up to 120 km/h or more.

The battery pack, the controller and the charging device are arranged on the frame adjacent to the front wheel. The center of gravity of the electric motorcycle is adjacent to the front, and the electric motorcycle can run stably even at a maximum speed of 120 km/h.

The electric motor is positioned on the rear fork, and the electric motor and the rear fork move up and down synchronously, so that there is no speed difference when the toothed drive belt drives, so that the rear wheel and the front wheel can be kept on the same plane, so that the electric motorcycle can reach a speed of 120 km/h or even more.

3

Figures 17, 18:
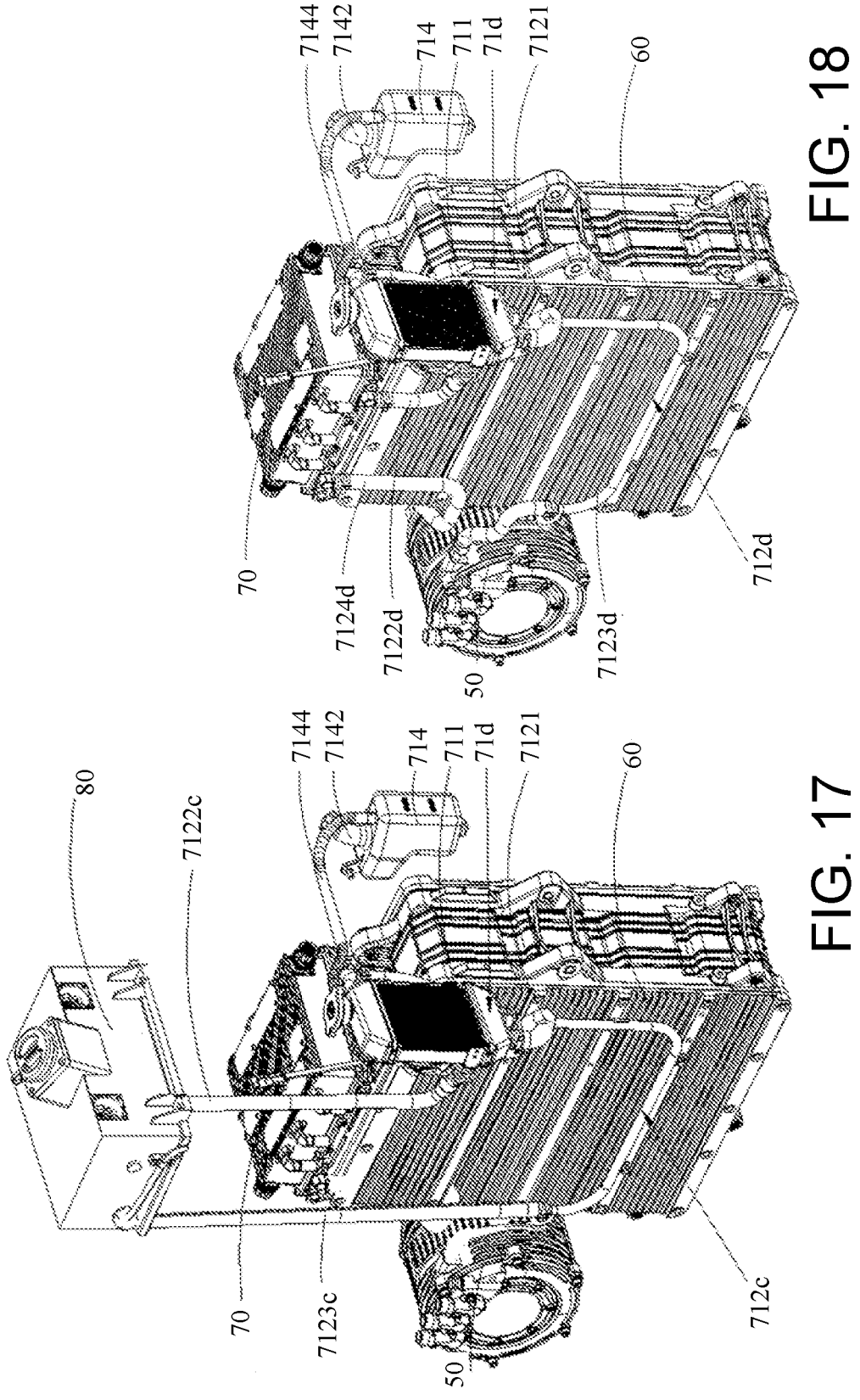

FIG. 17 is a front, right perspective view showing a cooling system with a second alternative set of connections, so it can provide cooling for the charging device.

FIG. 18 is a front, right perspective view showing a cooling system with a third alternative set of connections, so it can provide cooling for the controller and the electric motor.

Figures 19, 20:
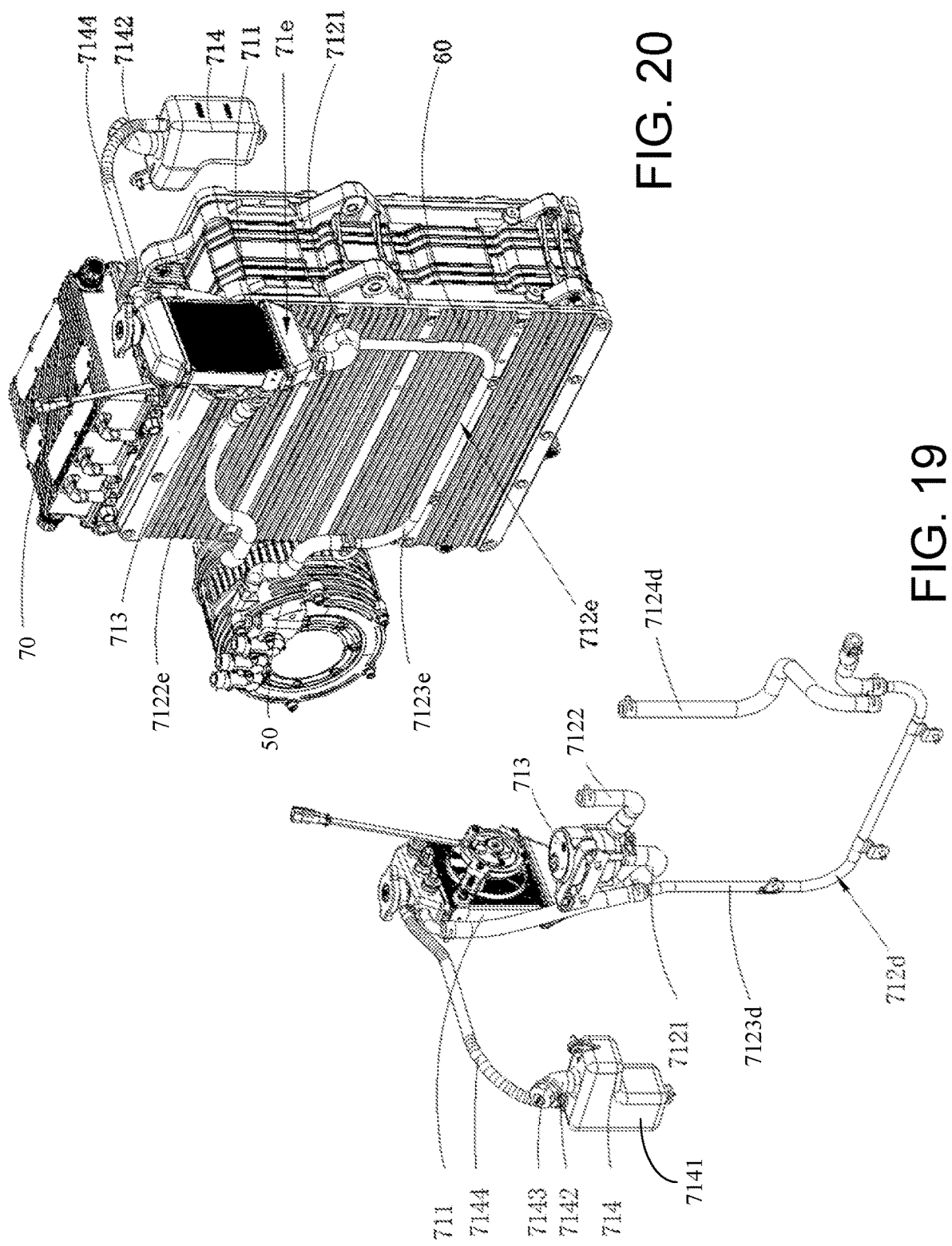

FIG. 19 is a rear perspective view showing the radiator and certain piping connections of FIG. 18.

FIG. 20 is a front, right perspective view showing a cooling system with a fourth alternative set of connections, so it can provide cooling for only the electric motor.

Figures 21, 22:
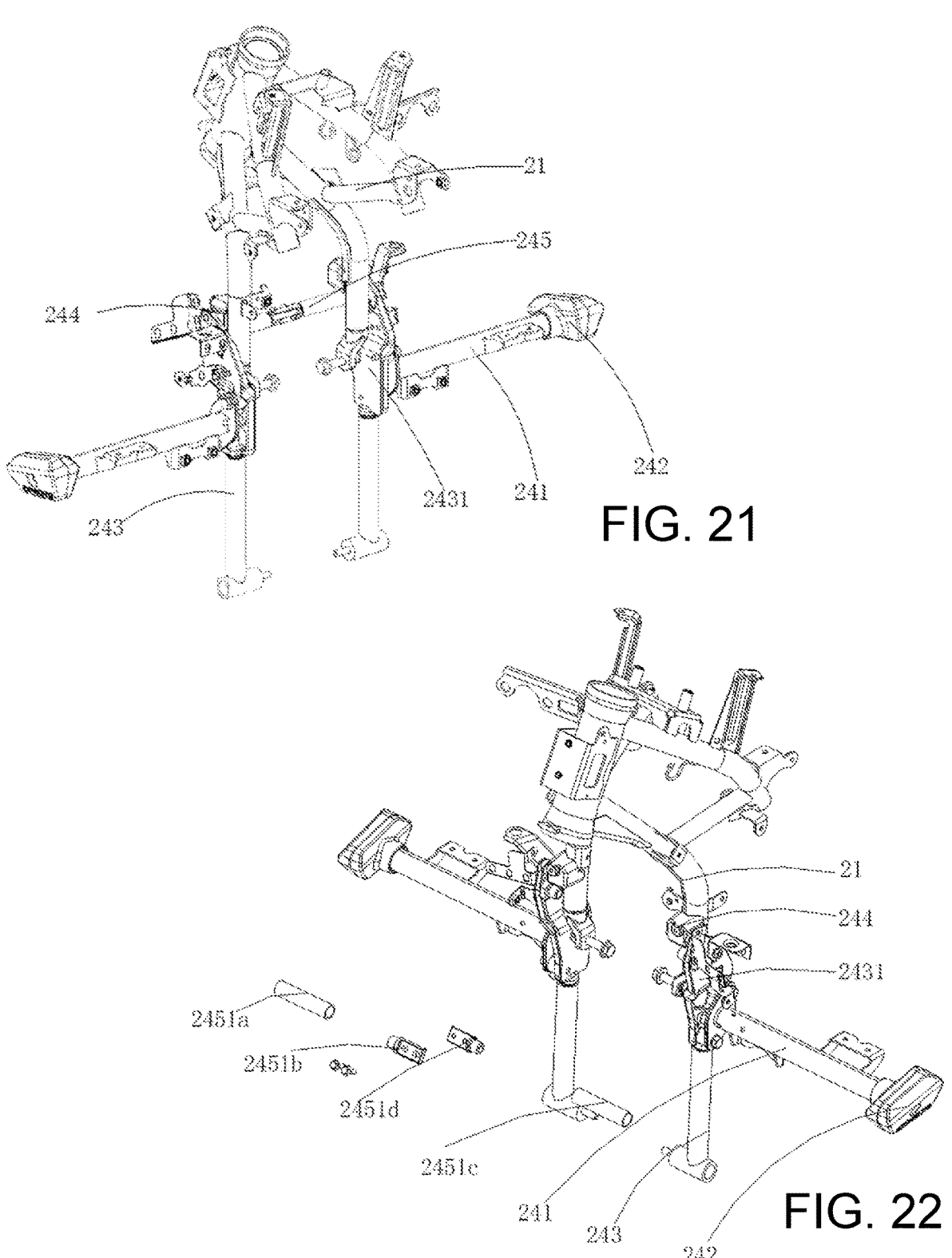

FIG. 21 is a rear, left perspective view of a front frame, front bumpers and battery bumper of FIGS. 1 and 3-5.

FIG. 22 is a front, left perspective view of the front frame and front bumpers of FIG. 21, showing the battery bumper in an exploded view.

Figures 23, 24:
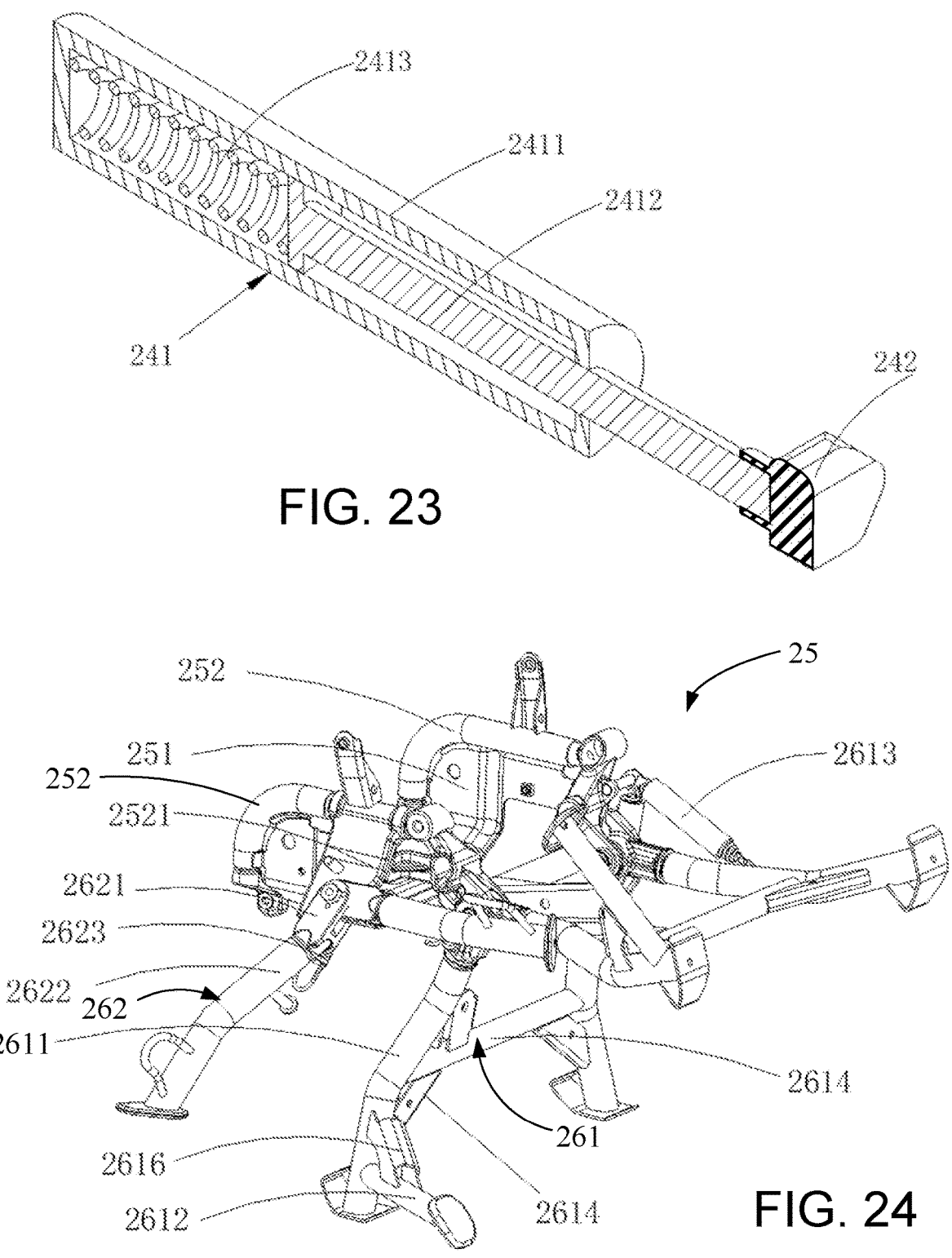

FIG. 23 is a cross-sectional, perspective view of one of the front bumpers of FIGS. 21 and 22.

Figure 1:
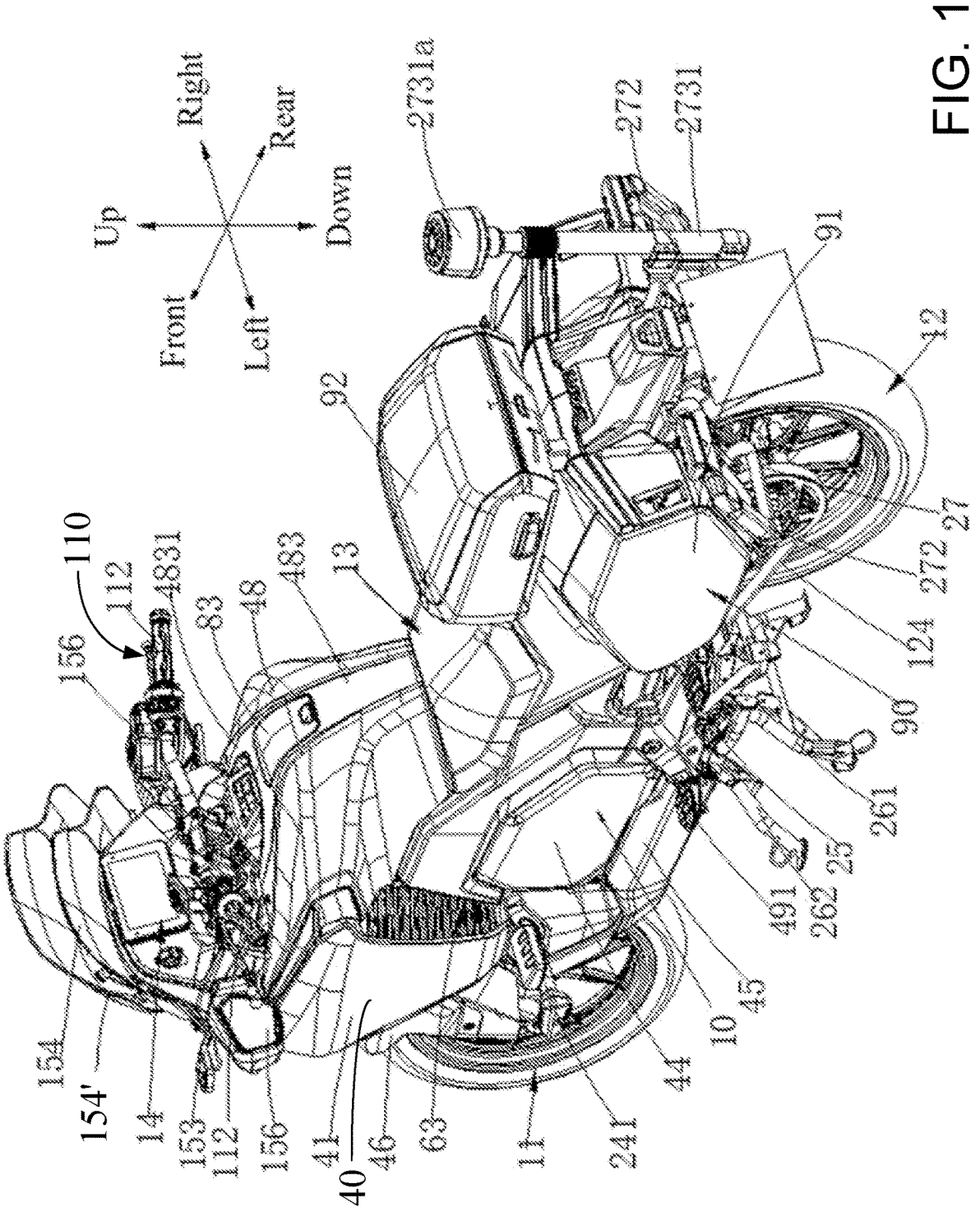
FIG. 1 is a rear perspective view of a preferred embodiment of the electric motorcycle of the present disclosure, showing both the windshield and the kickstand in two alternative (lowered and raised) positions.
Figure 2:
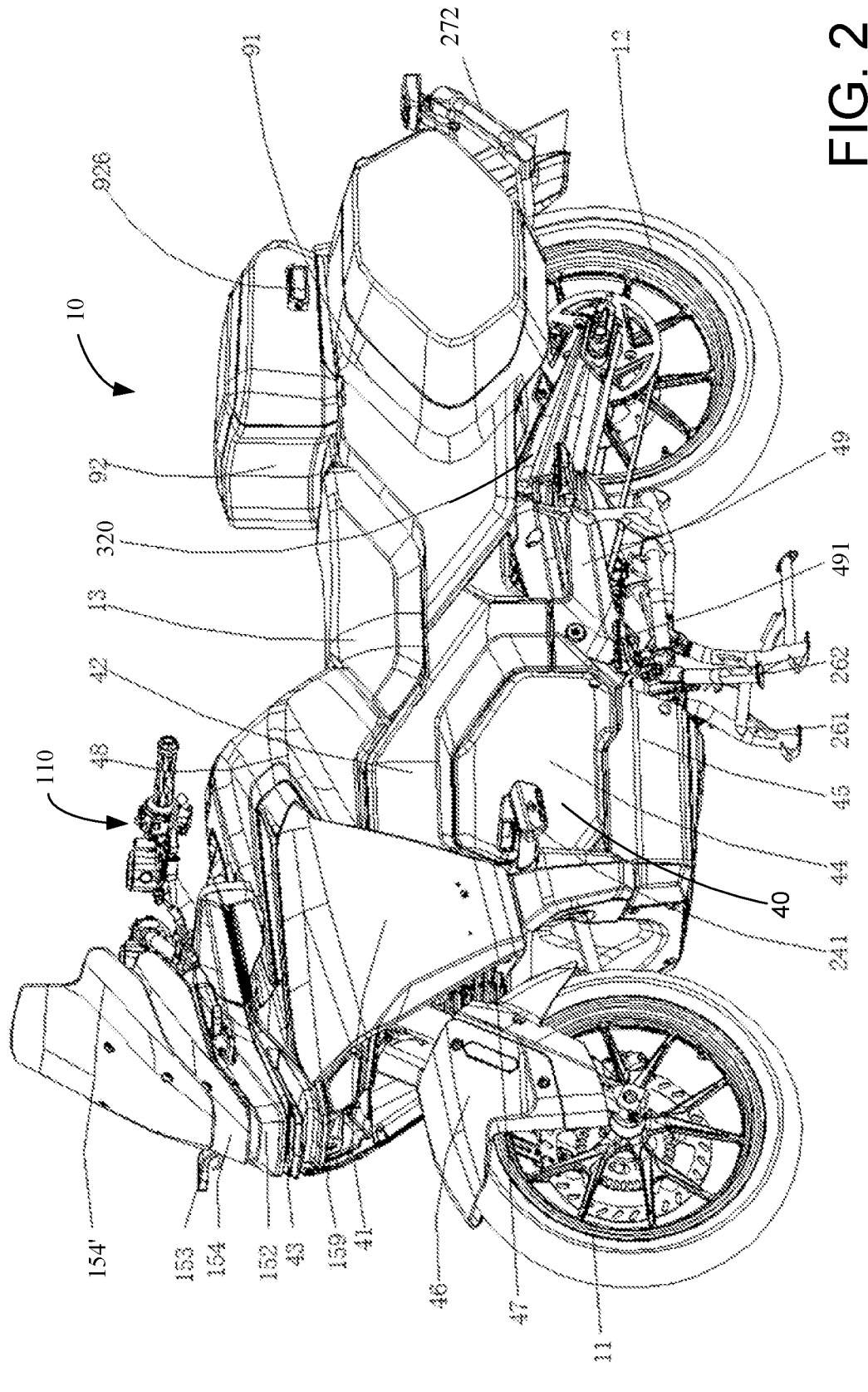
FIG. 2 is a front perspective view of the electric motorcycle of FIG. 1.

FIG. 24 is a perspective view of a kickstand of the electric motorcycle of FIGS. 1 and 2, showing the kickstand in both lowered and raised positions.

Figure 25:
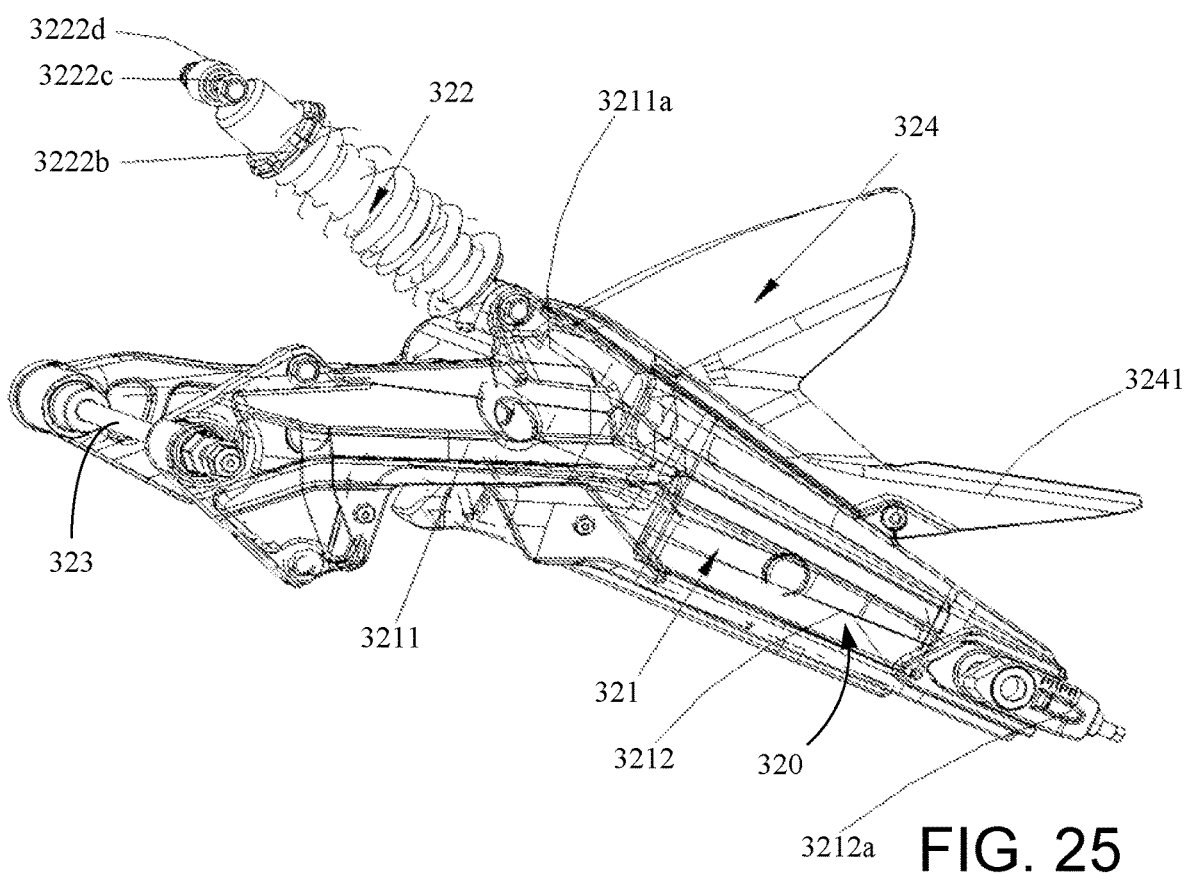

FIG. 25 is a perspective view of a rear suspension of the electric motorcycle of FIGS. 1 and 2.

Figure 26:
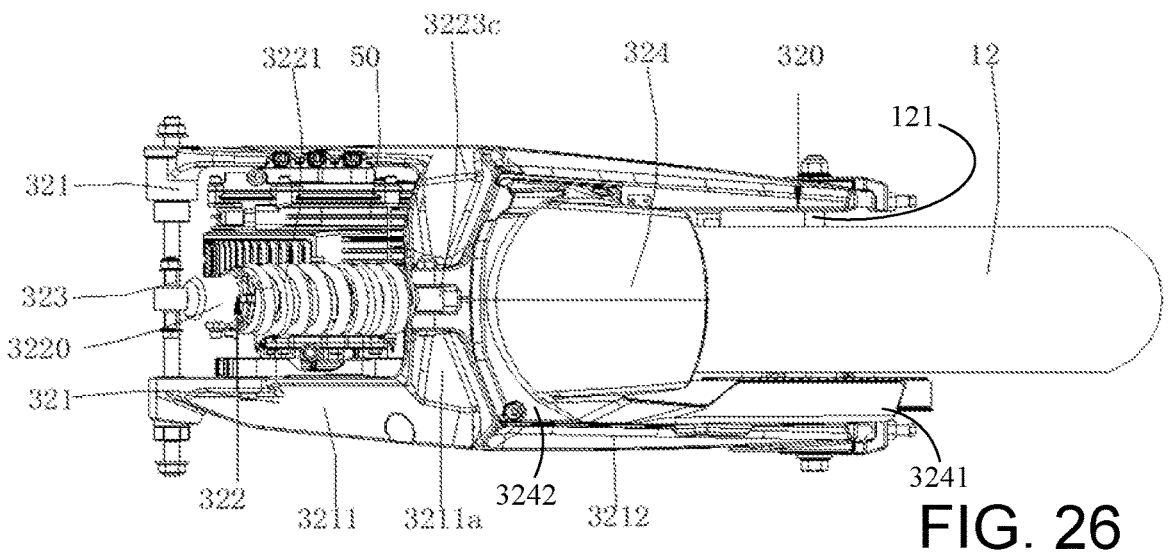

FIG. 26 is a top plan view of the rear suspension of FIG. 25 shown connected to the motor and rear wheel.

Figures 27, 28:
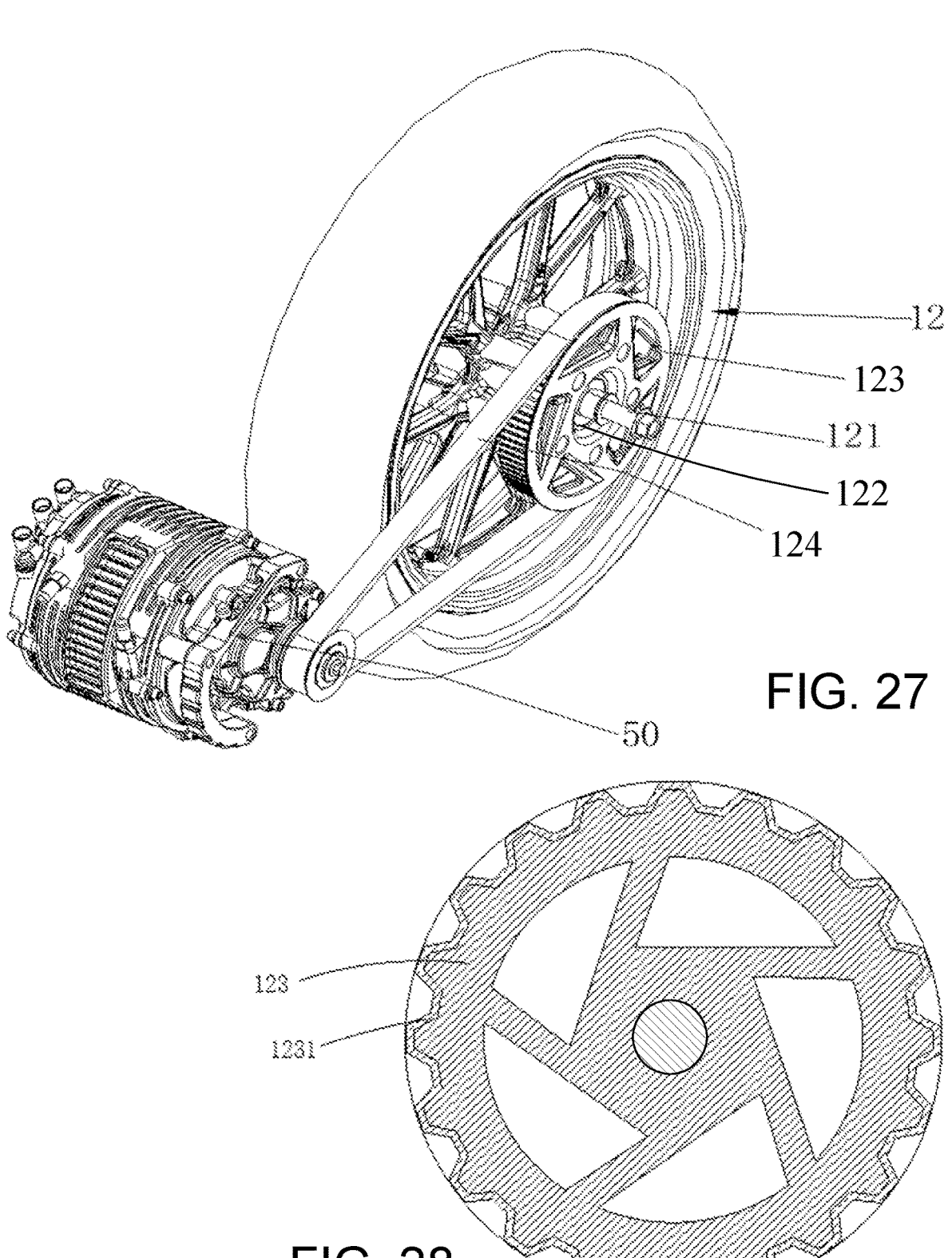

FIG. 27 is a perspective view of the motor and rear wheel of FIG. 26 shown connected by the drive belt.

FIG. 28 is a cross-sectional view of the pulley for the rear wheel of FIG. 27.

Figure 29:
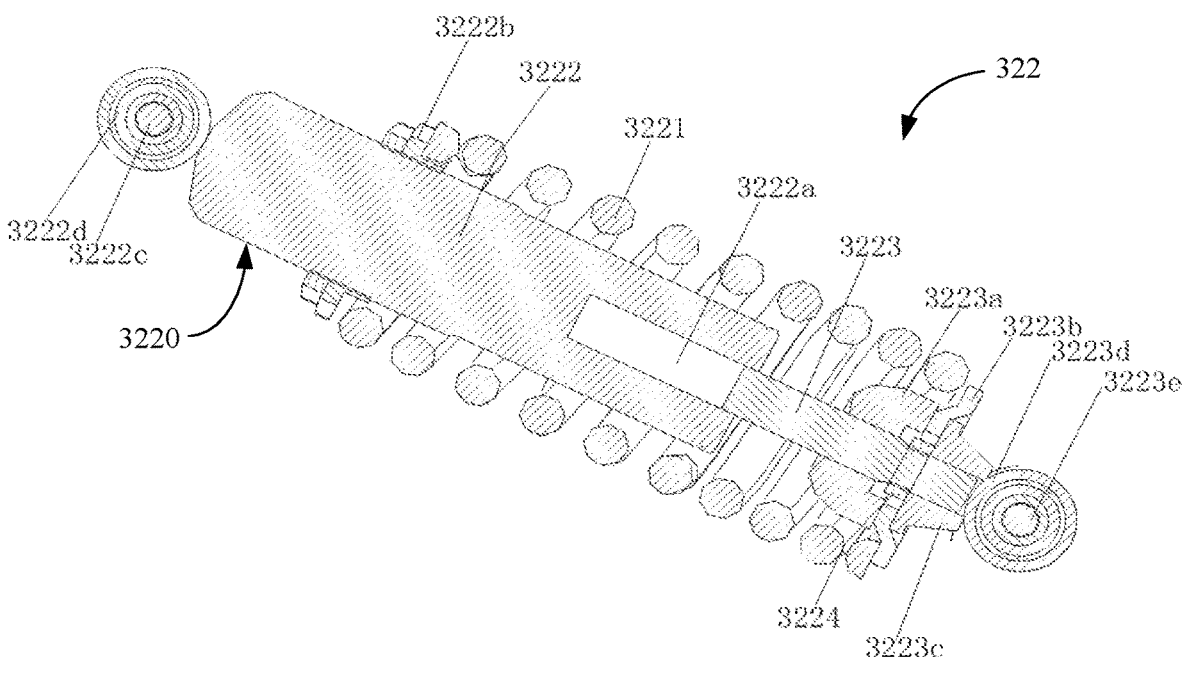

FIG. 29 is a cross-sectional view of the shock absorber of FIGS. 25 and 26 for the electric motorcycle.

Figure 30:
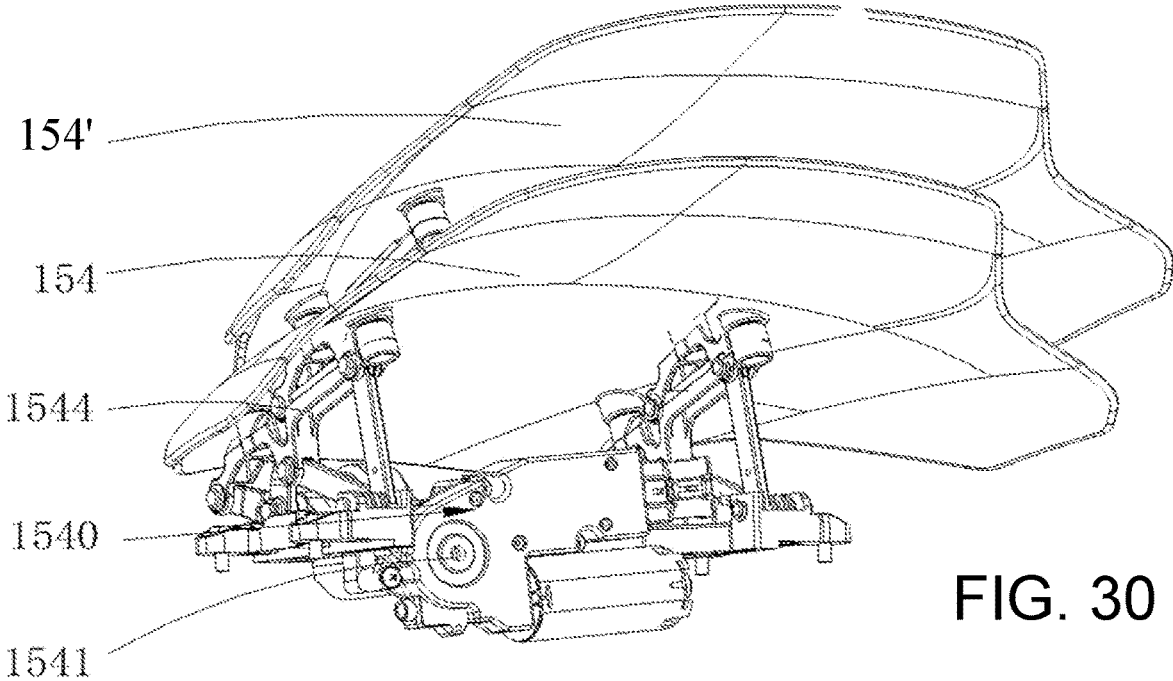

FIG. 30 is a perspective view of the lifting structure and windshield for the electric motorcycle of FIGS. 1 and 2, showing both lowered and raised positions of the windshield.

Figure 31:
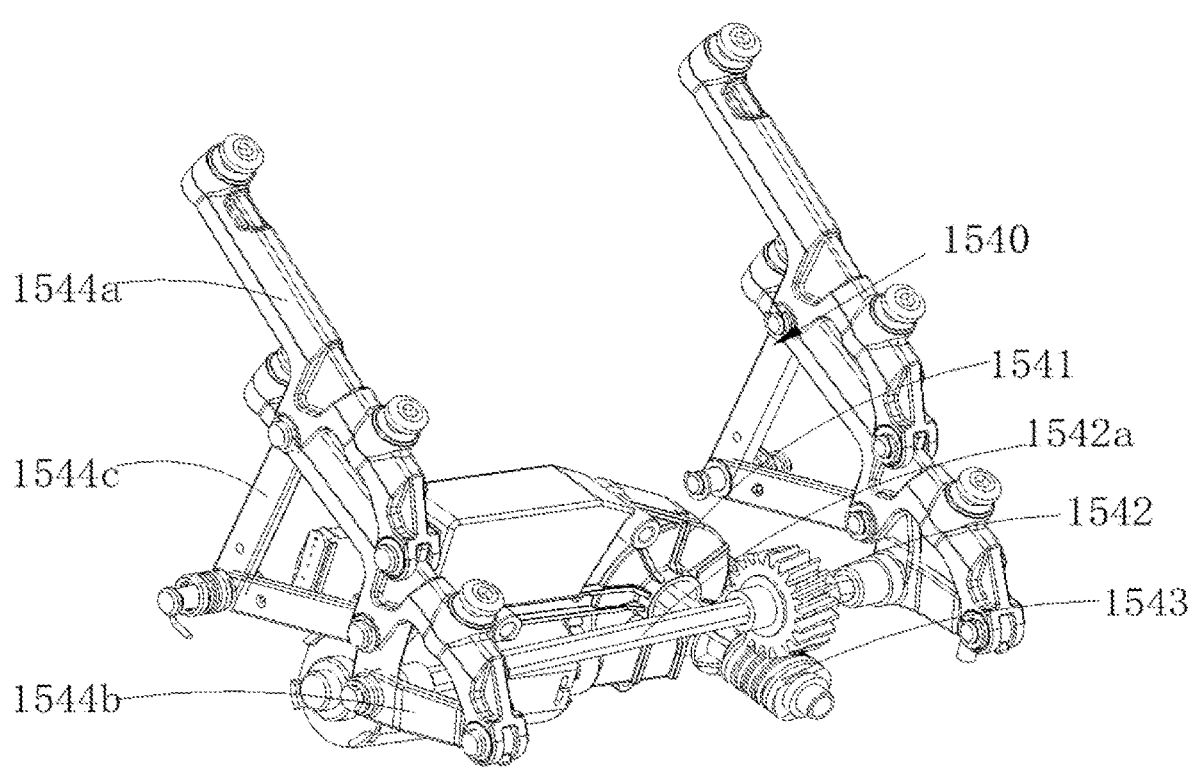

FIG. 31 is a perspective view of the lowered and raised positions of the lifting structure of FIG. 30.

Figure 32:
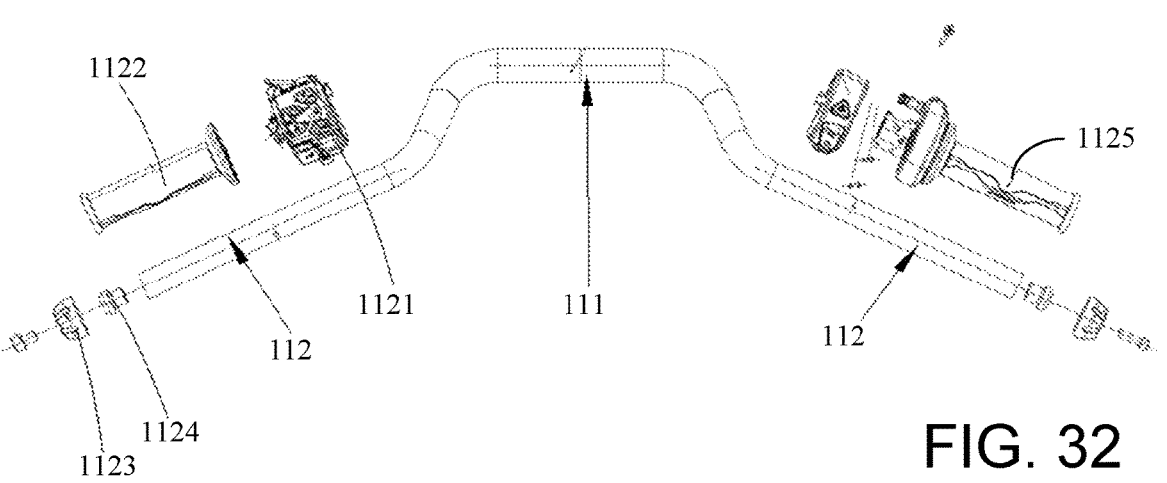

FIG. 32 is an exploded view of the steering handle of the electric motorcycle of FIGS. 1 and 2.

Figures 33, 34:
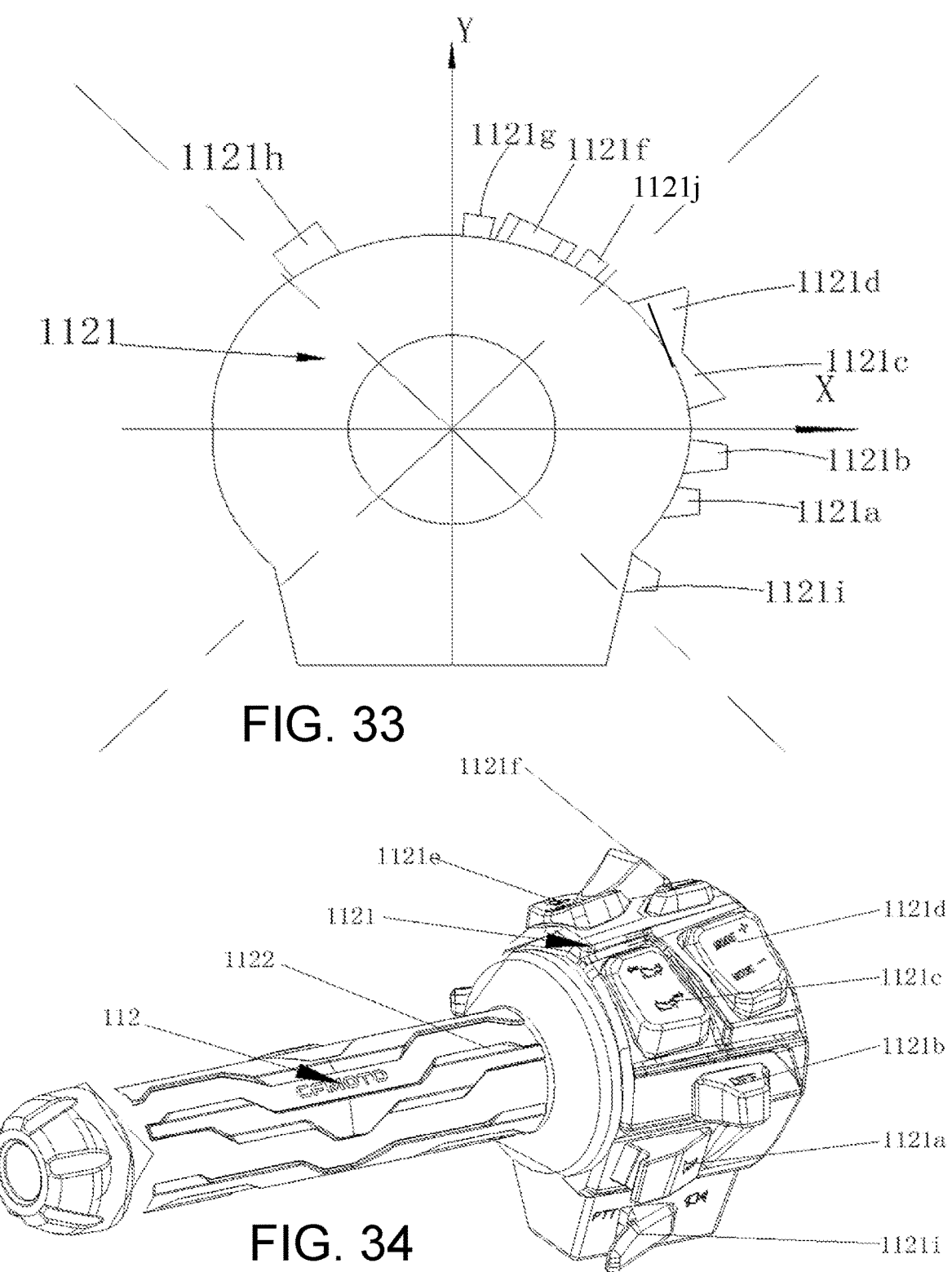

FIG. 33 is an end view of the switch assembly used on the steering handle of FIG. 32.

FIG. 34 is a perspective view of the switch assembly of FIGS. 32 and 33.

Figures 35, 36:
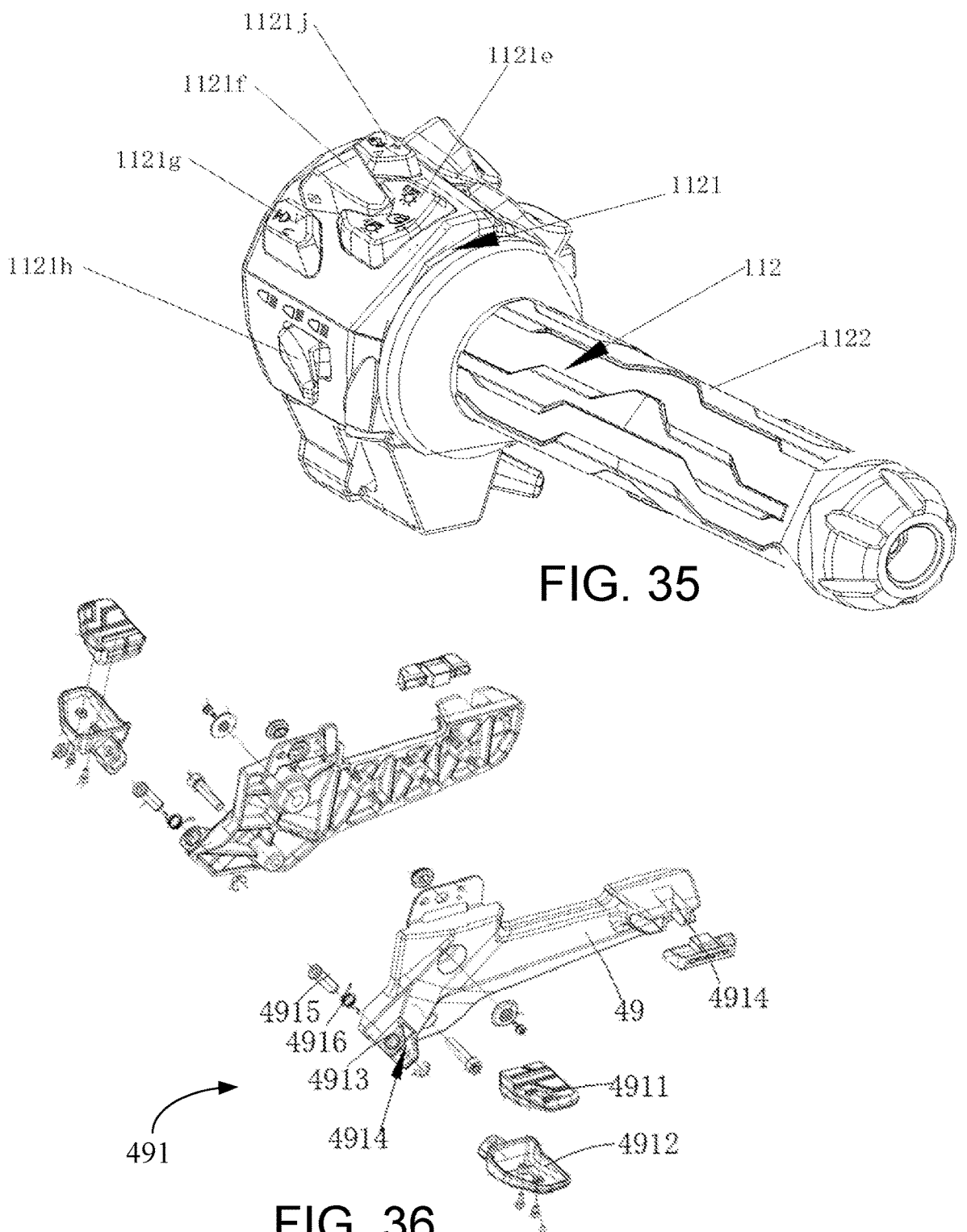

FIG. 35 is another perspective view of the switch assembly of FIGS. 32-34.

FIG. 36 is an exploded view of rear fork covering plate of the electric motorcycle of FIGS. 1 and 2.

Figure 37:
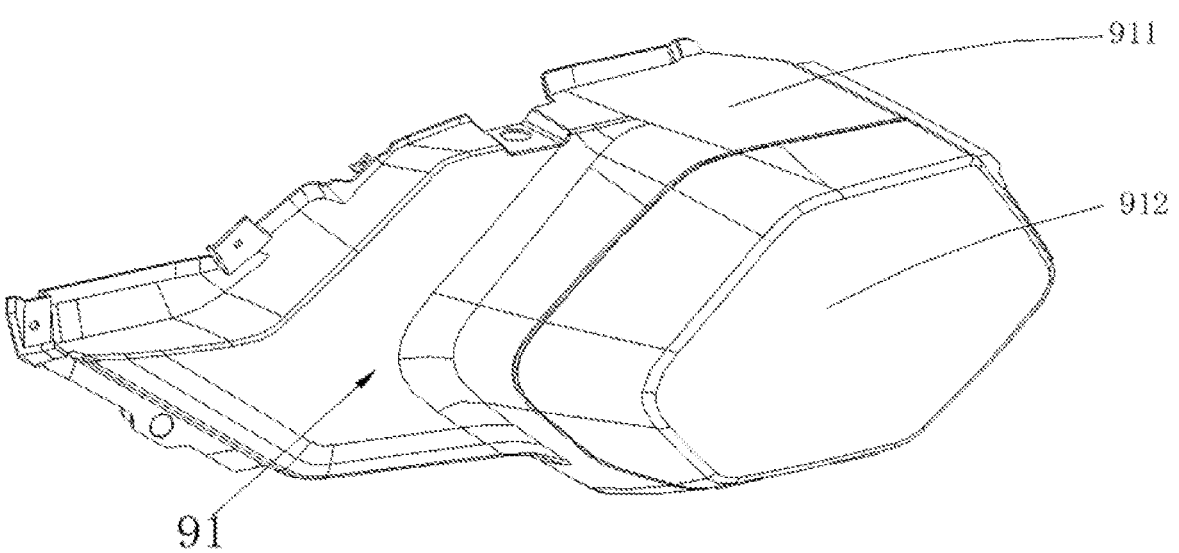

FIG. 37 is a perspective view of a side box of the electric motorcycle of FIGS. 1 and 2.

Figure 38:
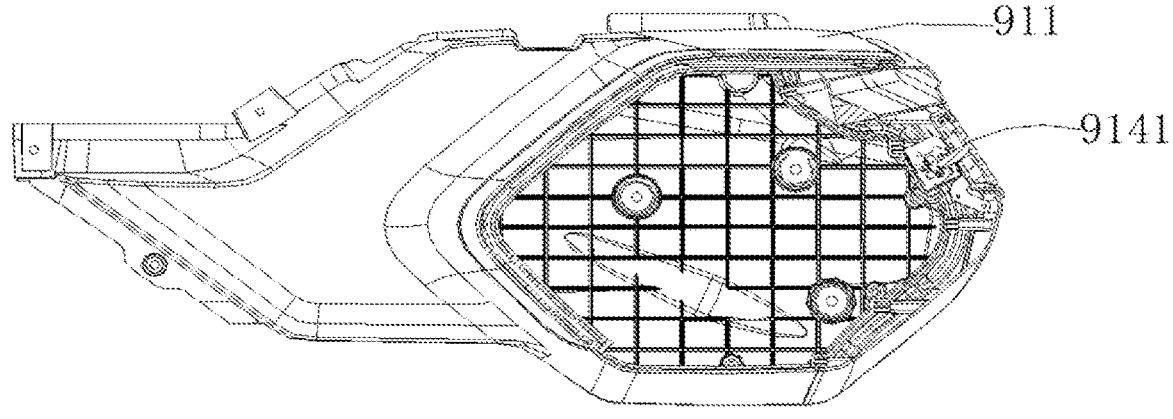

FIG. 38 is an interior view of the side box of FIG. 37 with the side box cover removed.

Figures 39, 40:
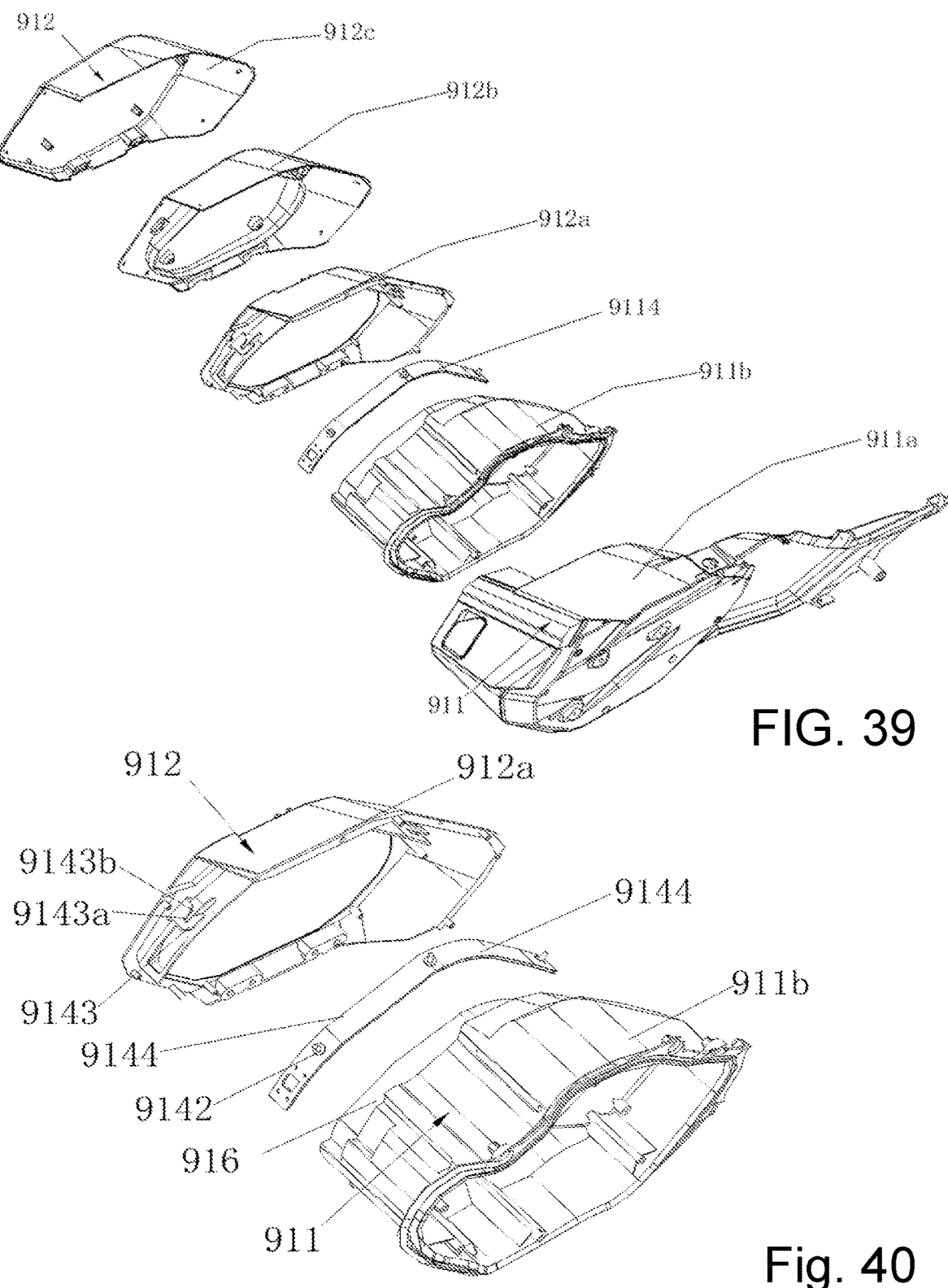

FIG. 39 is an exploded view of the side box of FIG. 37.

Figures 41, 42:
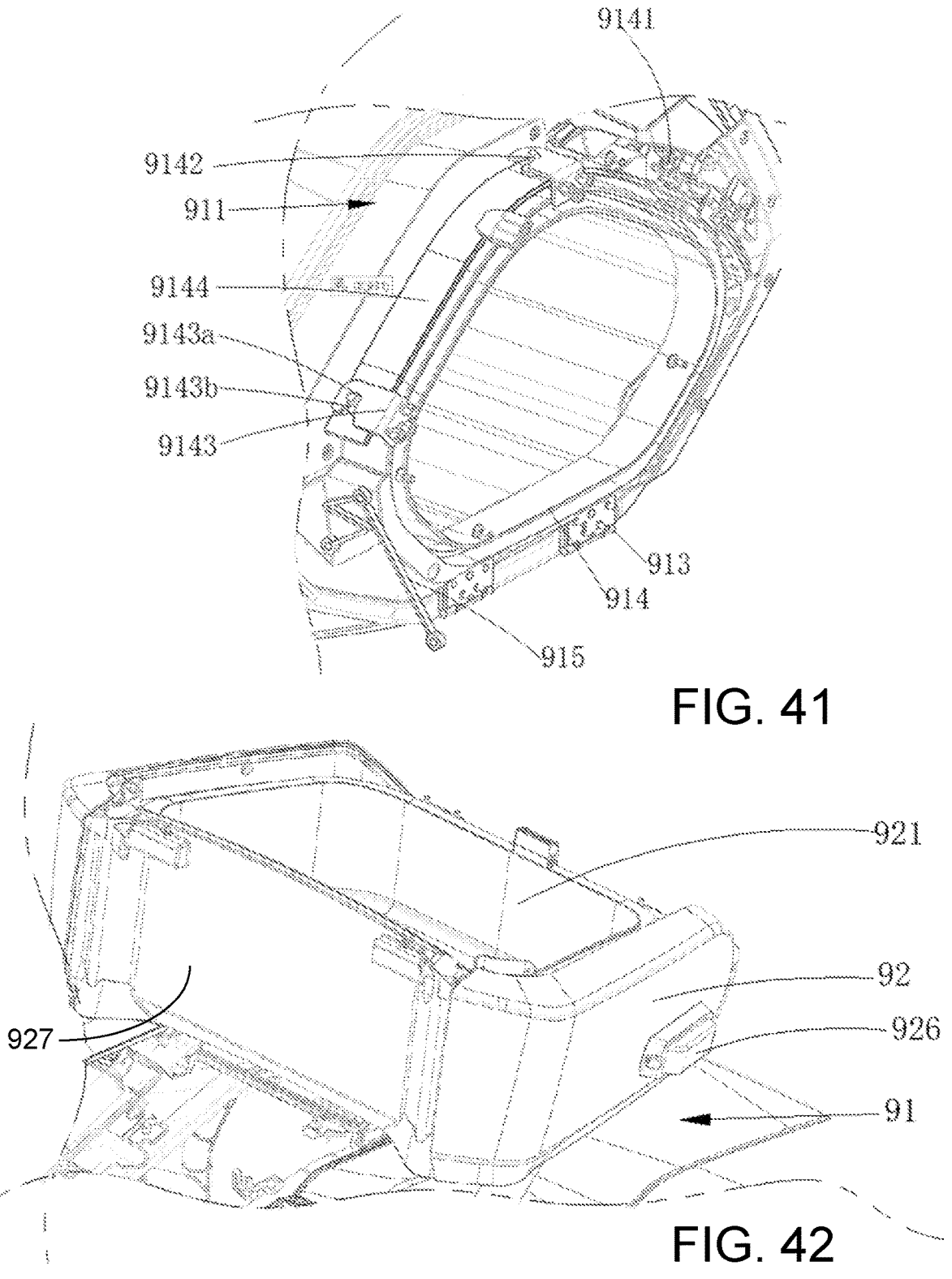

FIG. 40 is an exploded view of a part of the structure in FIG. 41.

FIG. 41 is a perspective view of the side box body of FIGS. 37-39.

FIG. 42 is a perspective view of a rear trunk of the electric motorcycle in FIG. 1.

Figures 43, 44:
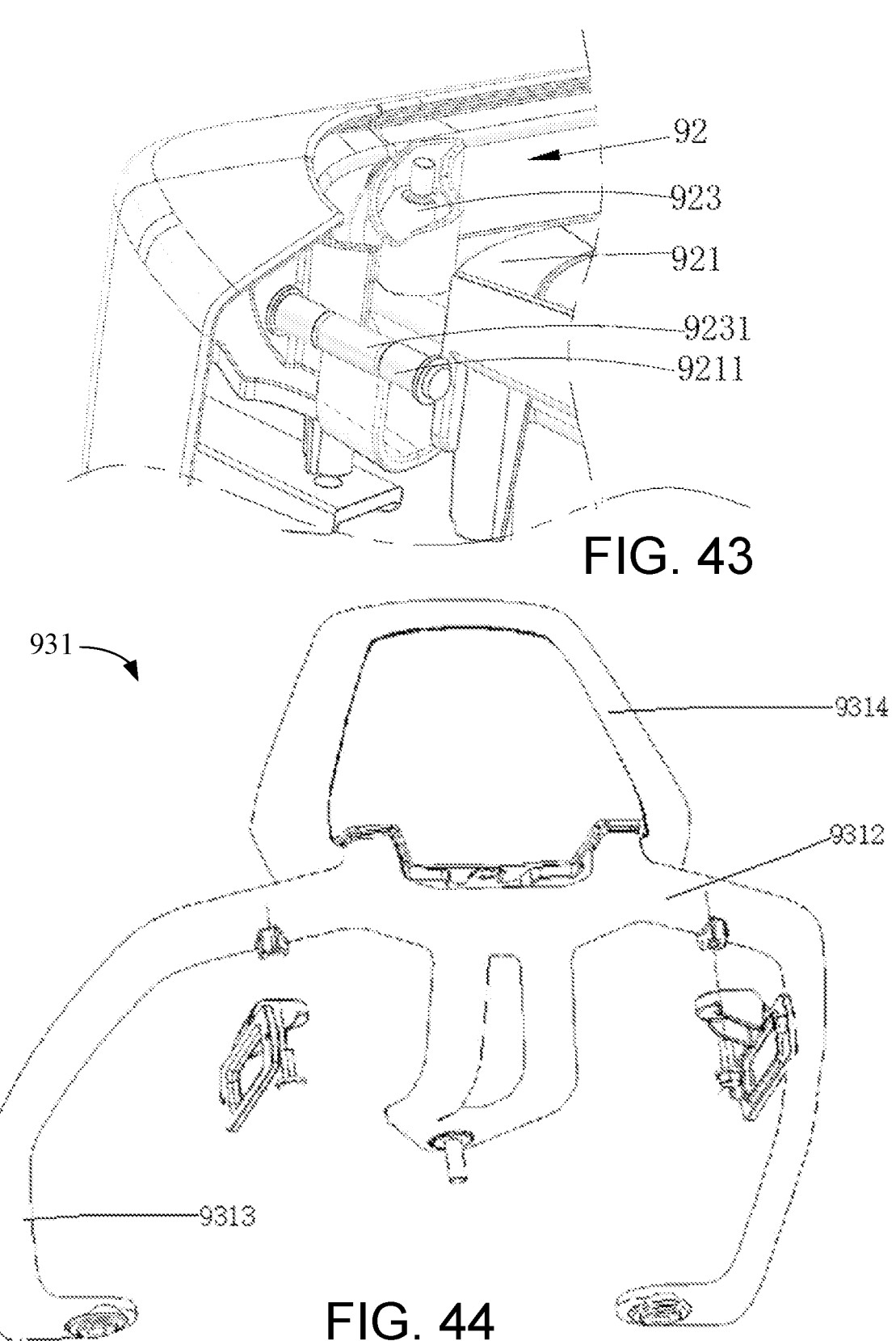

FIG. 43 is a perspective view of a hinge assembly for the rear trunk of FIG. 42.

FIG. 44 is a perspective view of a backrest assembly which can alternatively be used with the electric motorcycle in FIG. 1.

4

Figure 45:
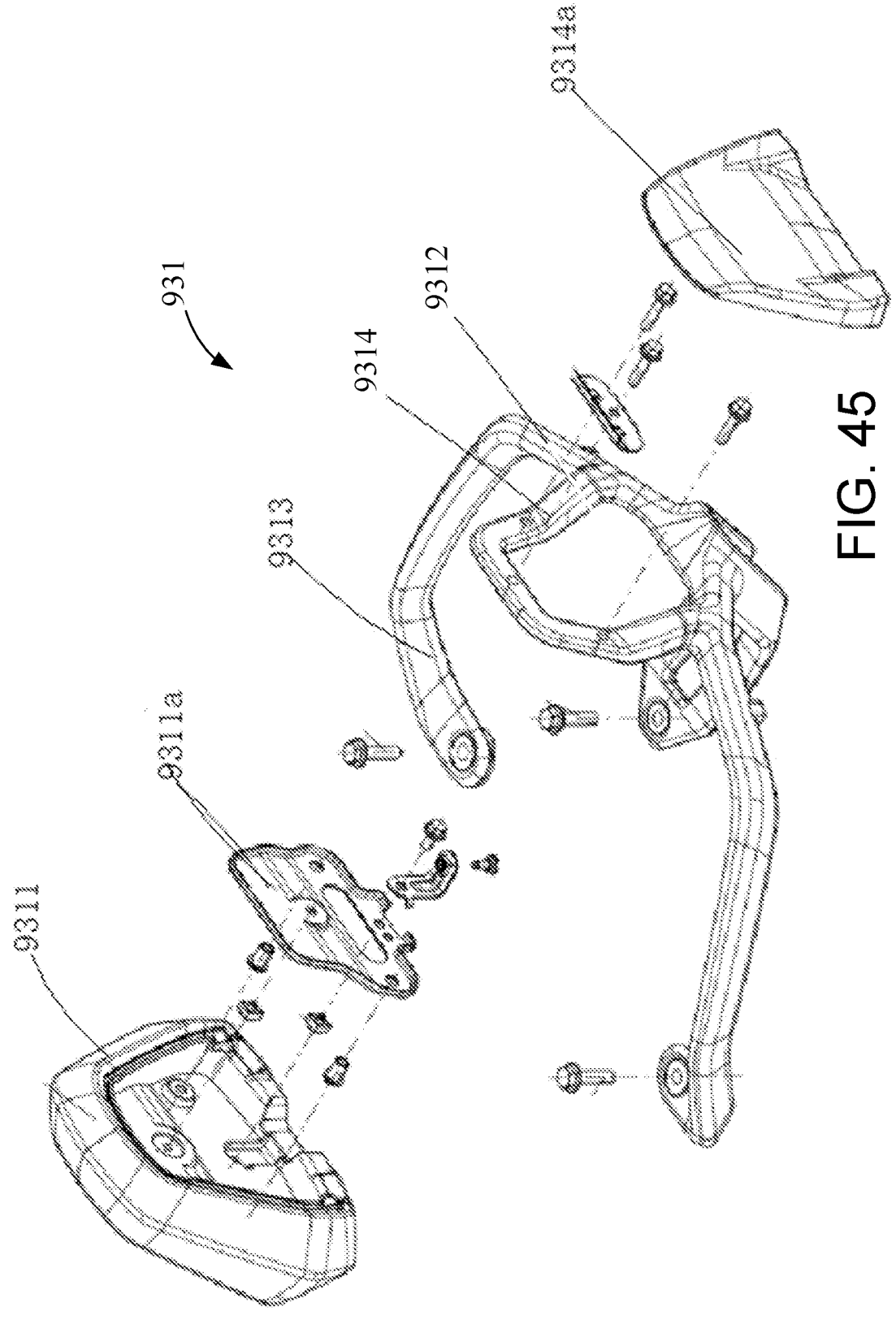

FIG. 45 is an exploded view of the backrest assembly of FIG. 44.

DETAILED DESCRIPTION

For a better understanding of the purpose, technical solutions and advantages of the present disclosure, preferred embodiments of the present disclosure are described and illustrated below. In the following description, the directions of front, rear, left, right, up and down and similar directional words are based on the direction of driving of the electric motorcycle and shown in FIG. 1.

FIG. 1 is a perspective view of a preferred embodiment of the electric motorcycle of the present invention from the back to the front. FIG. 2 is another perspective view of the electric motorcycle.

As shown in FIG. 1 and FIG. 2, the preferred electric motorcycle 10 includes a frame 20 (called out in FIGS. 3-5), a front wheel 11, a rear wheel 12, at least one seat 13, and a dashboard panel 14. A front suspension supports the frame 20 from the front wheel 11, and a rear suspension supports the frame 20 from the rear wheel 12, and the motorcycle 10 includes a braking system for at least one and preferably both the front wheel 11 and the rear wheel 12. The frame 20 includes a front frame 21 adjacent to front wheel 11 and rear frame 22 adjacent to rear wheel 12. The motorcycle 10 preferably also includes a vehicle cover 40 which extends around an electric motor 50 (called out such as in FIGS. 3, 8 and 10) and a battery pack 60 (such as shown in FIGS. 3-8). The motorcycle 10 includes a controller 70 which may be positioned above the battery pack 60 such as in FIGS. 3 and 8, and a charging device 80 (shown in FIGS. 3, 13-15 and 18) for the battery pack 60. A rear side-box assembly 90 is preferably positioned to the sides of the rear wheel 12 above its axle, and a front fairing 43 is preferably positioned above the front wheel 11. A steering system 110 allows the driver hand control of the motorcycle 10. The battery pack 60 and the controller 70 are respectively arranged on the frame 20. The battery pack 60 supplies electric power for the controller 70 and the motor 50. The controller 70 controls the electric motor 50 to drive the rear wheel 12 to rotate. The charging device 80 is arranged on the frame 20. The charging device 80 can be connected to the public electricity supply system by wires, so as to convert alternating current (AC) from the public electricity supply system into direct current (DC) to charge the battery pack 60.

In the preferred embodiment, the battery pack 60, the controller 70 and the charging device 80 are arranged in sequence along the height direction of the frame 20, and the vertical dimension from the charging device 80 to the dashboard panel 14 is less than the vertical dimension from the battery pack 60 to the dashboard panel 14. The battery pack 60, the controller 70 and the charging device 80 are arranged on the frame 20 adjacent to and just behind the front wheel 11. This position for placing the battery pack 60, controller 70 and charging device 80 on the frame 20 corresponds to the position of the fuel tank on gasoline fueled motorcycles. This position for placing the battery pack 60, controller 70 and charging device 80 also helps to keep the electric motorcycle 10 more compact. The center of gravity of electric motorcycle 10 is concentrated on the half adjacent to the front wheel 11, and the center of gravity is lower than it would be for many other positions of the battery pack, controller and charging device. With the compact arrangement and low and balanced center of gravity, the electric motorcycle can run stably and safely even at speeds around 120 km/h. The volume of electric motorcycle 10 is smaller and wind resistance is reduced as compared to other positions of the battery pack, controller and charging device, thereby improve the controllability of electric motorcycle while achieving high performance.

Figures 6, 7:
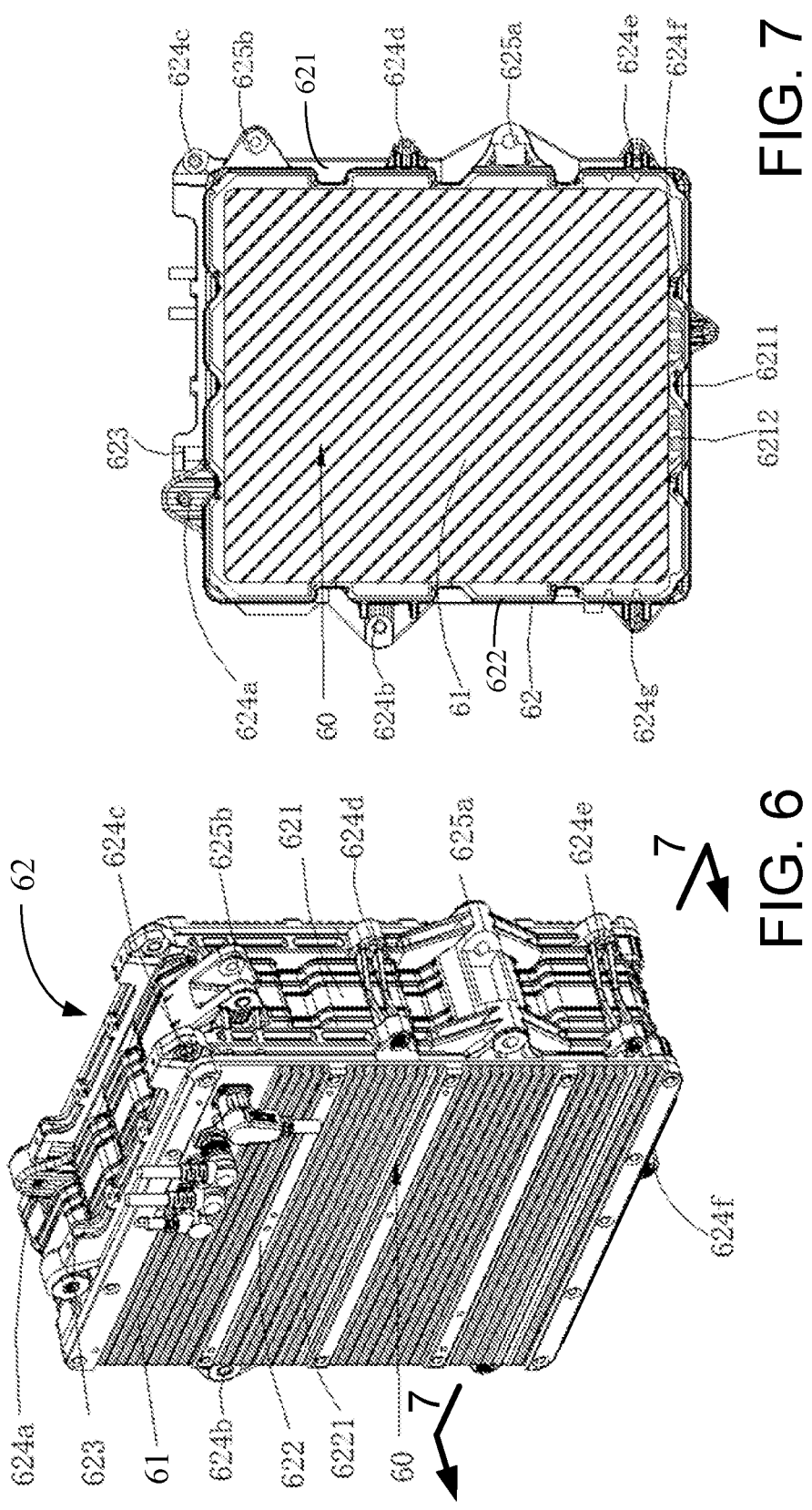
FIG. 6 is a rear perspective view of the battery pack used in the electric motorcycle of FIGS. 1 and 2.
FIG. 7 is a cross-sectional view of the battery of FIG. 6, taken along cut lines 7-7 in FIG. 6.

As best shown in FIGS. 6 and 7, the battery pack 60 preferably includes a battery 61 and a battery case 62, with the battery 61 being arranged in the battery case 62. The battery case 62 is connected to the frame 20. The battery case 62 enhances the strength of the frame 20 and improves the firmness of the electric motorcycle 10.

As shown in FIGS. 6 and 7, the battery case 62 preferably includes a body case 621 and a plurality of side plates 622, which can be fixed to the body case 621 such as by screws. The side plates 622 are provided with a plurality of ribs 6221. The ribs 6221 increase the surface area of the battery case 62 and improve the heat dissipation of the battery pack 60. At the same time, the ribs 6221 enhance the strength of the battery case 62, thereby improving the safety of the electric motorcycle 10.

As shown in FIG. 7, the bottom of the body case 621 is preferably provided with a plurality of indentations 6211. In this embodiment, the number of indentations 6211 is three. A cushion block 6212 having a plurality of holes is arranged between two adjacent indentations 6211. The upper end surface of the cushion block 6212 is flat with the upper end surface of the indentations 6211. The battery 61 is arranged in the body case 621 and is supported by the indentations 6211 and the cushion blocks 6212.

As shown in FIG. 1, the electric motorcycle is preferably provided with a cooling air passage 63 for cooling the battery pack 60. The cooling air passage 63 is a passage formed around the battery pack 60 defined as a space between the vehicle cover 40 and the battery pack 60. Heat can be quickly dissipated from the battery pack 60 via the cooling air passage 63, which can keep the working temperature of the battery pack 60 within a preset range, reducing electricity loss of the battery pack 60 when the electric motorcycle 10 is running at high speed, thereby ensuring the safety and endurance of the electric motorcycle 10.

Figure 8:
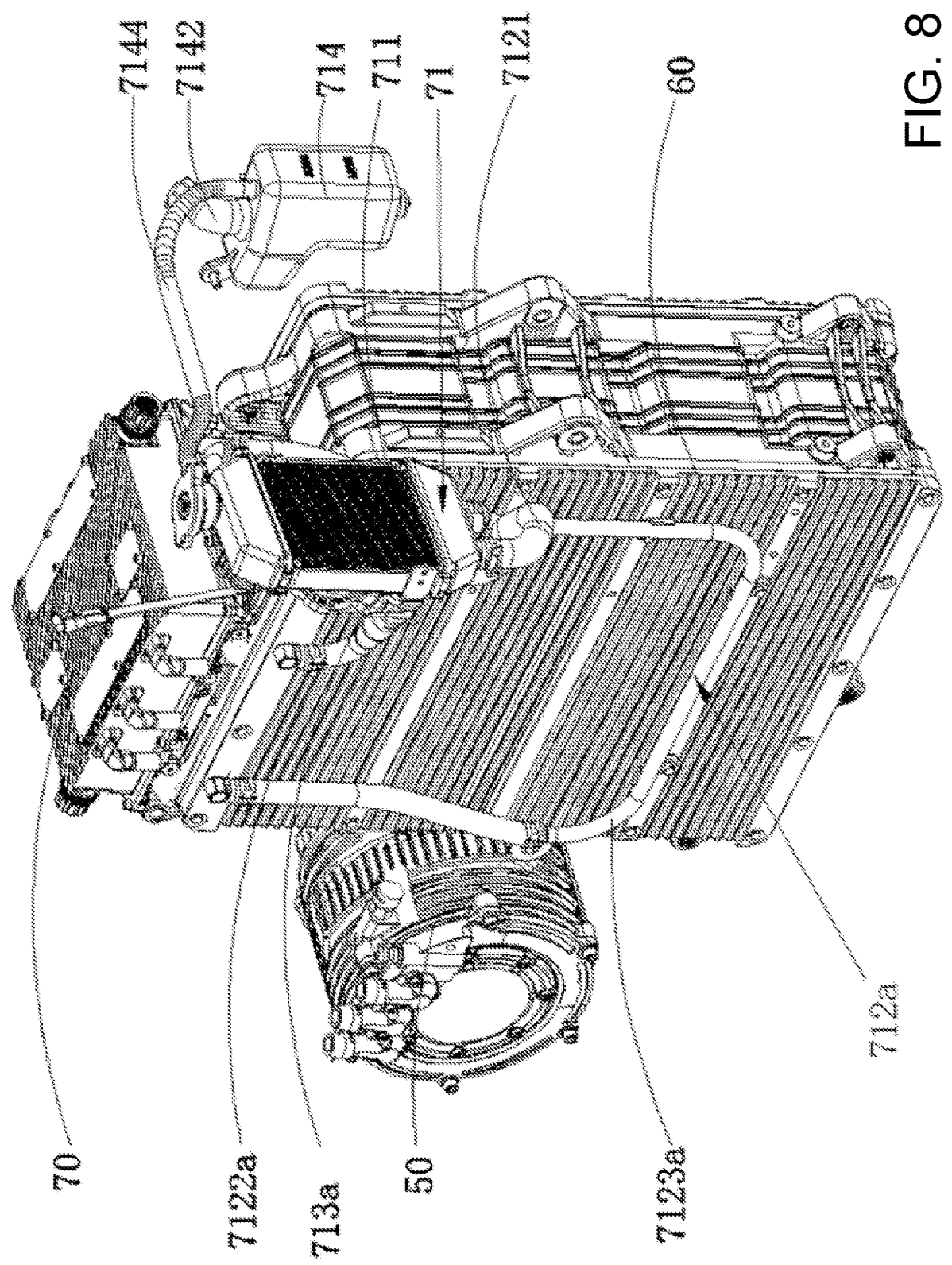
FIG. 8 is a front right perspective view of a cooling system used in cooling the battery pack of FIG. 6 in one embodiment of the present invention.
Figures 9, 10:
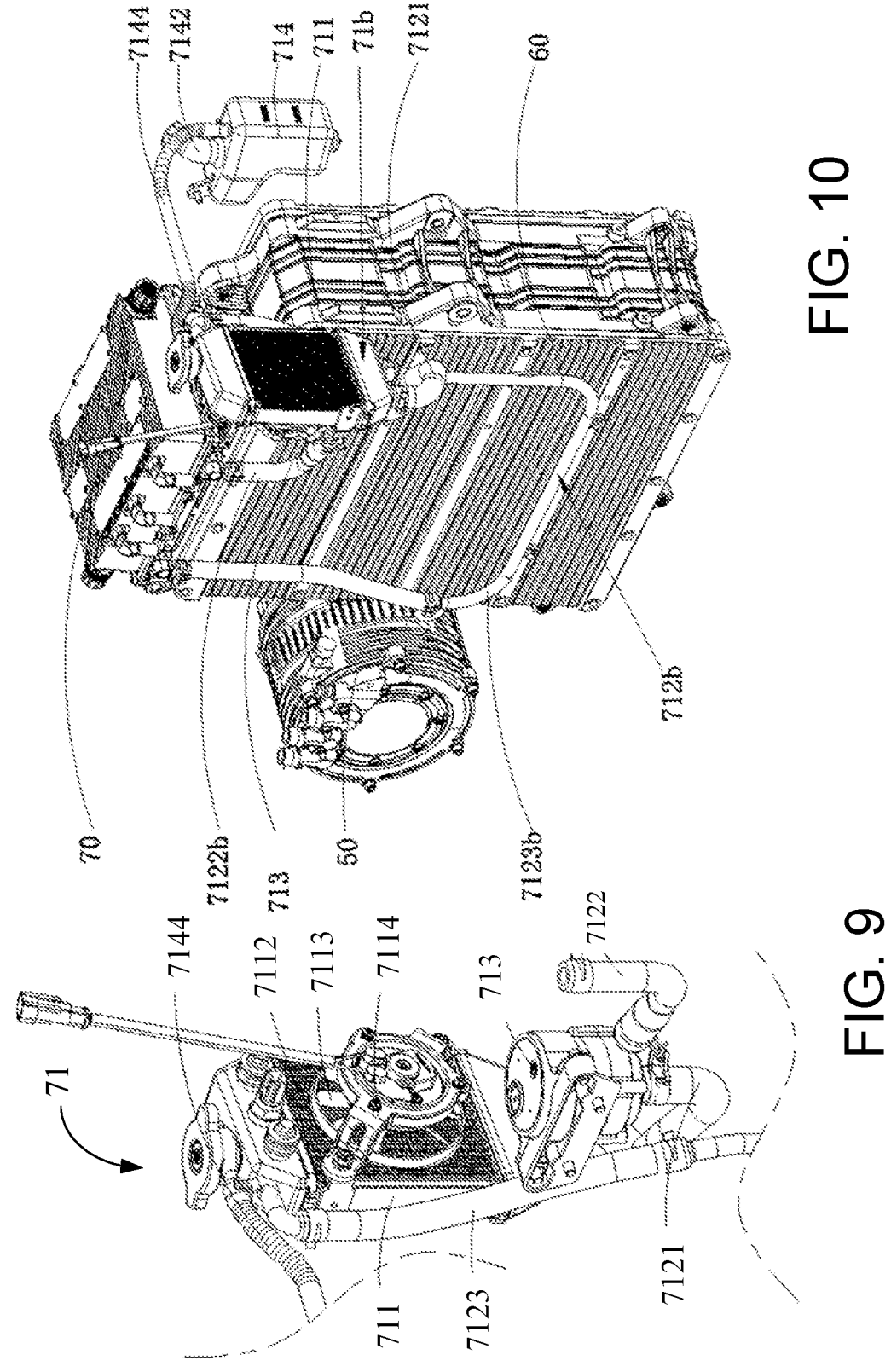
FIG. 9 is a rear perspective view showing the radiator of FIG. 8.
FIG. 10 is a front right perspective view showing a cooling system with an alternative set of connections, so it can provide cooling for the controller.

FIG. 8 shows a first embodiment of a cooling system 71a in the electric motorcycle, in which the battery pack 60 is not only cooled by air flow but is also cooled down using a radiator 711. Liquid-cooling can rapidly cool the battery pack 60 so as to avoid high temperatures, helping the battery pack 60 to work normally and efficiently even when the electric motorcycle 10 is running at high speed or up hills. The cooling system 71a includes a radiator 711, coolant pipe connections 712a, and a water pump 713 in fluid communication with the radiator 711 through the coolant pipe connections 712a. The coolant used in the cooling system 71a can be water or can be another coolant as commonly used in vehicle cooling systems, with the pump 713 being referred to as a water pump even if a different coolant liquid is used. The radiator 711 is preferably located toward the front of the battery pack 60, and some or all of the coolant pipe connections 712a can be secured to a side of the battery pack 60. The coolant pipe connections 712a include a first branch pipe 7121, a second branch pipe 7122a and a third branch pipe 7123a. One end of the first branch pipe 7121 receives coolant from the outlet of the radiator 711, and the other end provides coolant to the inlet of the water pump 713. One end of the second branch pipe 7122a receives coolant from the outlet of the water pump 713, and, in this embodiment, the other end provides coolant to a coolant inlet of the battery pack 60. In this embodiment, the third branch pipe 7123a receives coolant from the coolant outlet of the battery pack 60, and the other end provides coolant to the return end of the radiator 711. The third branch pipe 7123a is preferably partially fixed on the battery pack 60. FIG. 9 shows only the portions of the second branch pipe 7122 and third branch pipe 7123 which are common to all the disclosed embodiments of cooling system 71.

As called out in FIG. 9, a plurality of cooling fins 7112 are arranged on the side wall of the radiator 711. The cooling fins 7112 increase the contact area between metal of the radiator 711 and air to improve the heat dissipation effect of the radiator 711.

The cooling system 71 also preferably includes a cooling fan 7113, which is arranged on one side of the radiator 711 so as to blow air through the radiator 711. The cooling fan 7113 is supported by a fan bracket 7114, which can be fixed on the radiator 711 such as by screws. The air inlet side of the cooling fan 7113 faces toward the seats 13, and the air outlet of the cooling fan 7113 faces toward the dashboard panel 14. When the cooling fan 7113 is turning, the air flow generated by the cooling fan 7113 flows forwardly through the radiator 711, which improves heat dissipation efficiency of the radiator 711 and keeps the coolant in the cooling system 71 at a low temperature, thereby improving the cooling efficiency of the cooling system 71 and maintaining the performance of the battery pack 60. The airflow generated by the cooling fan 7113 flows from the side adjacent to the seat 13 to the side far away from the seat 13, so as to avoid hot air blowing directly to the driver.

The preferred cooling systems 71 also includes an auxiliary coolant tank 714, also referred to as an overflow tank, arranged on the frame 20. The auxiliary coolant tank 714 is in fluid communication with the radiator 711 through a liquid delivery pipe 7144. A negative pressure is formed in the radiator 711 when the volume of the coolant in the cooling system 71 decreases, and a positive pressure is formed in the radiator 711 when the volume of the coolant in the cooling system increases. The coolant in the auxiliary coolant tank 714 can be delivered to or from the radiator 71 by sucking or pushing coolant through the liquid delivery pipe 7144 in response to the negative or positive pressure. The auxiliary coolant tank 714a can keep the coolant level in the radiator 711 full, maintaining the cooling performance of the cooling system 71.

Figure 3:
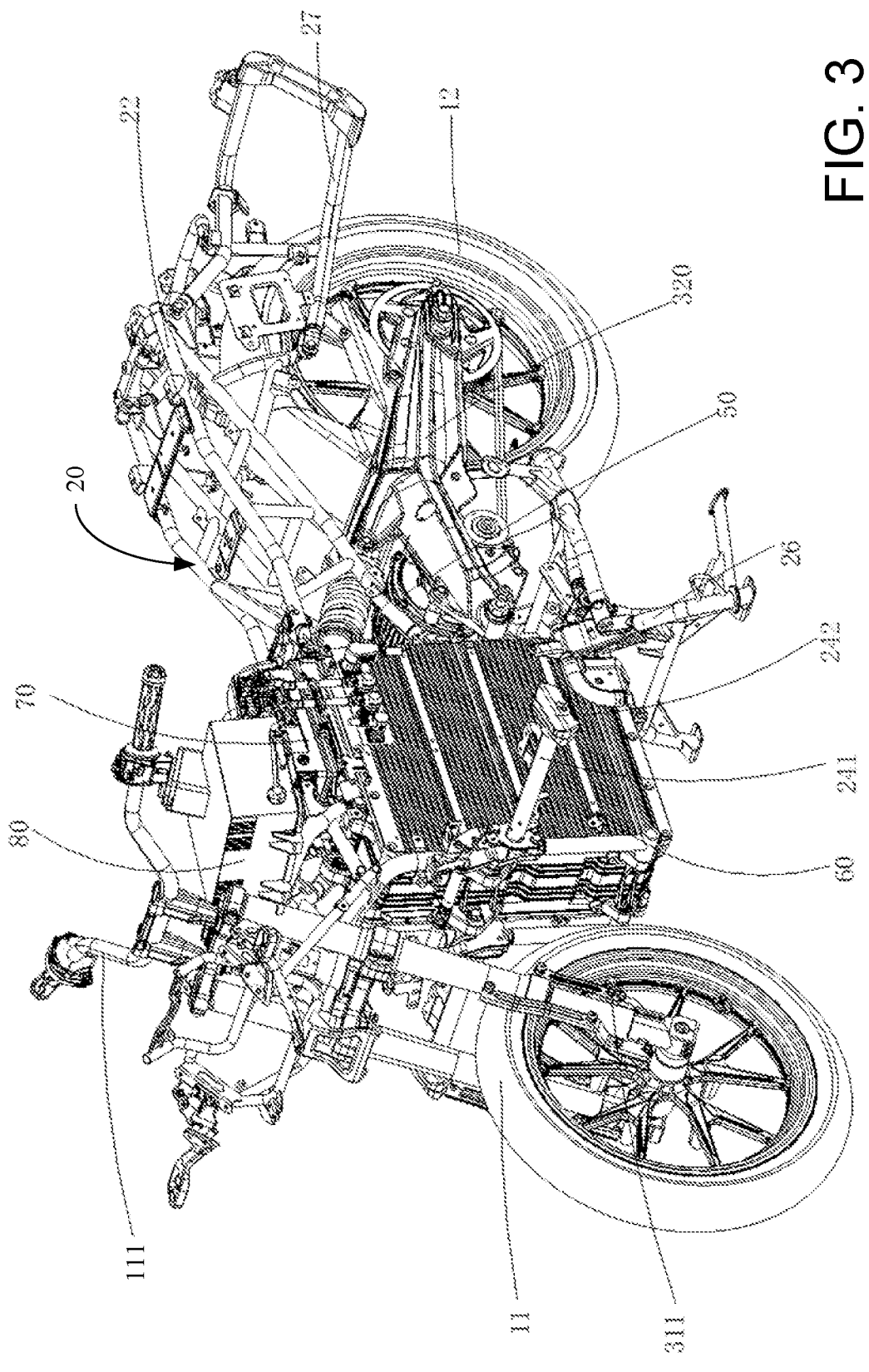
FIG. 3 is a front perspective view of the electric motorcycle of FIGS. 1 and 2 without a vehicle cover.
Figure 4:
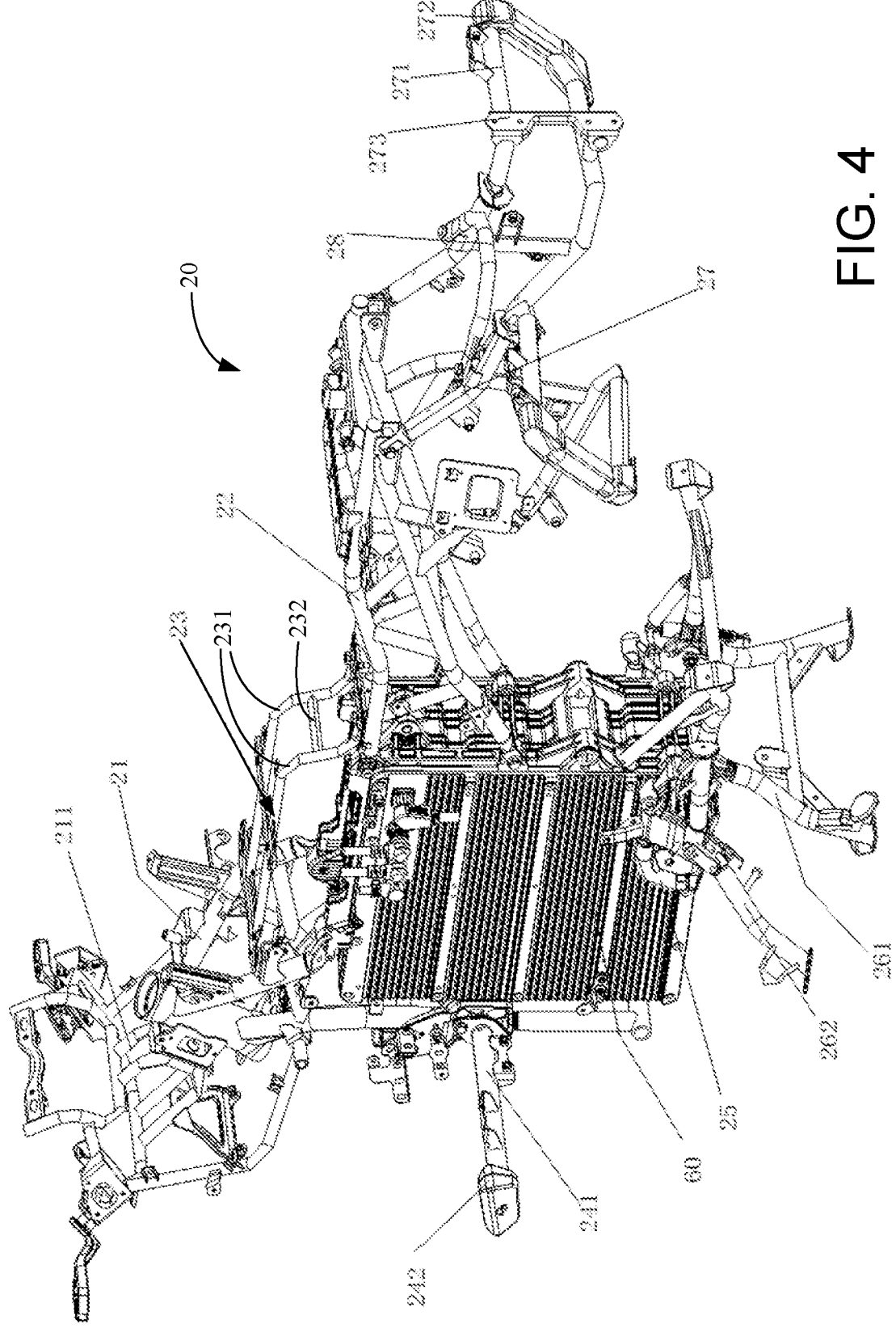
FIG. 4 is a rear perspective view of the frame of the electric motorcycle of FIGS. 1 and 2.
Figure 5:
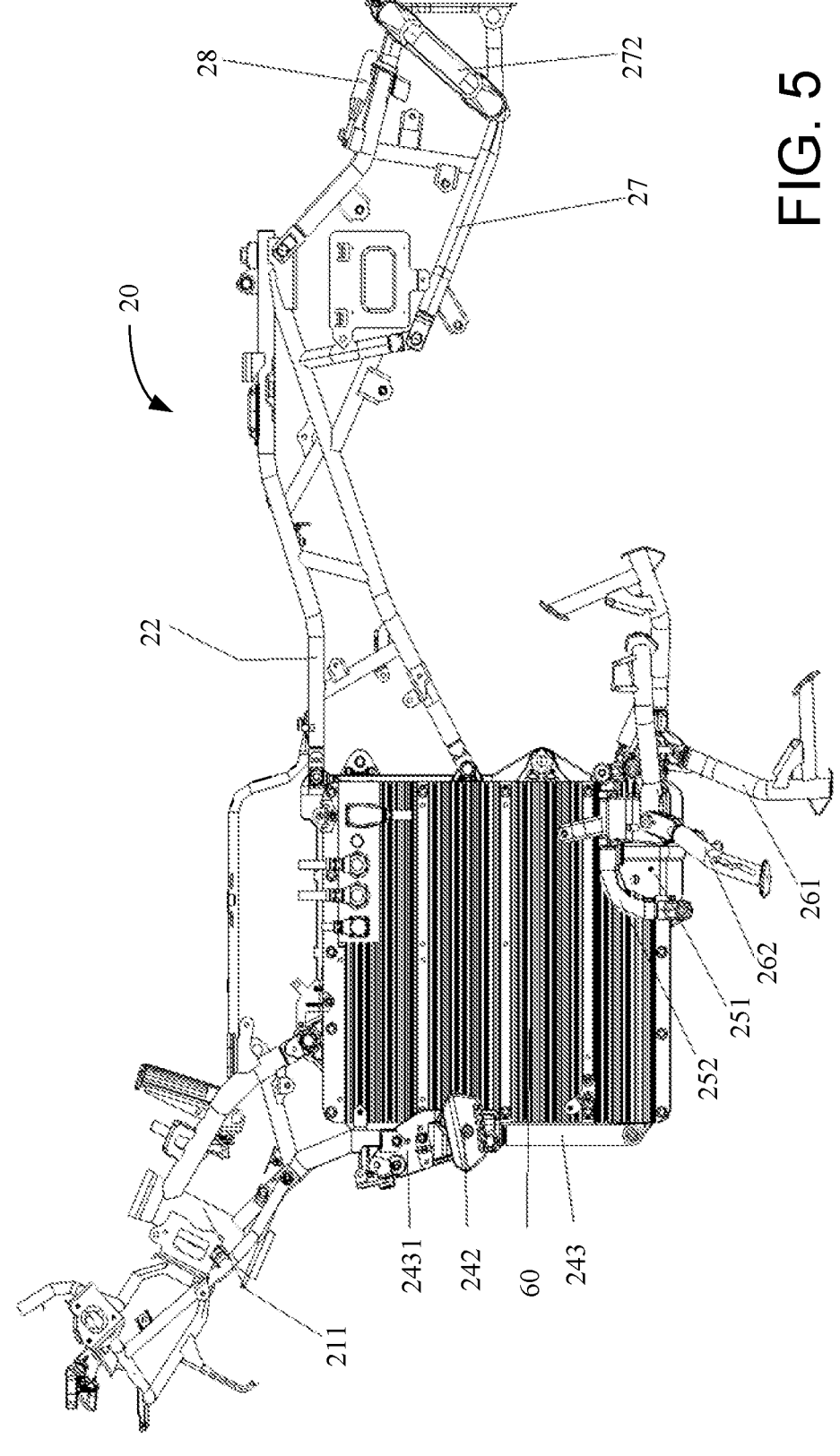
FIG. 5 is a side perspective view of the frame of the electric motorcycle of FIGS. 1 and 2.

As best shown in FIGS. 4 and 5, the frame 20 further includes a reinforcement bracket 23 connected to the front frame 21 and the rear frame 22. As depicted in FIG. 3, the charging device 80 is preferably arranged immediately on top of the reinforcement bracket 23, while the controller 70 is preferably arranged immediately below the reinforcement bracket 23. The reinforcement bracket 23 preferably includes two reinforcement rods 231 symmetrically arranged and a transverse brace rod 232 connecting the two reinforcement rods 231. Each reinforcement rod 231 preferably includes a longitudinal reinforcement rod body part 2311 and a vertical reinforcement rod body part 2312 connected by a bent rod part 2313. Each longitudinal reinforcement rod body part 2311 has its leading end connected to the front frame 21, and each vertical reinforcement rod body part 2312 has its lower end connected to the rear frame 22 by a connecting rod part 2314.

In the preferred embodiment shown in FIG. 3, the controller 70 is positioned between the charging device 80 and the battery pack 60. The controller 70 is provided with a wire connector, which is connected to the electric motor 50 through cables. The controller 70 is preferably arranged immediately on top of the battery case 62, rearwardly of the dashboard panel 14 and adjacent to the seat 13. As shown in FIG. 6, the battery case 62 may include a mounting portion 623 on its top providing a groove. The controller 70 is preferably installed in the groove of the mounting portion 623 and fixed on the battery case 62 such as by screws.

FIG. 10 shows an alternative cooling system 71*b* which is connected for cooling of the controller 70 rather than for cooling of the battery pack 60. The coolant in the second branch pipe 7122*b* flows to a coolant inlet of the controller 70, with the third branch pipe 7123*b* receiving coolant from the coolant outlet of the controller 70. In other embodiments, the coolant in the cooling system flows through both the battery pack 60 and the controller 70. In such embodiments, whether the coolant is directed first through the battery pack 60 and then through the controller 70 or vice versa depends upon which device (battery pack 60 or controller 70) is desired to maintain a lower operating temperature.

Figure 11:
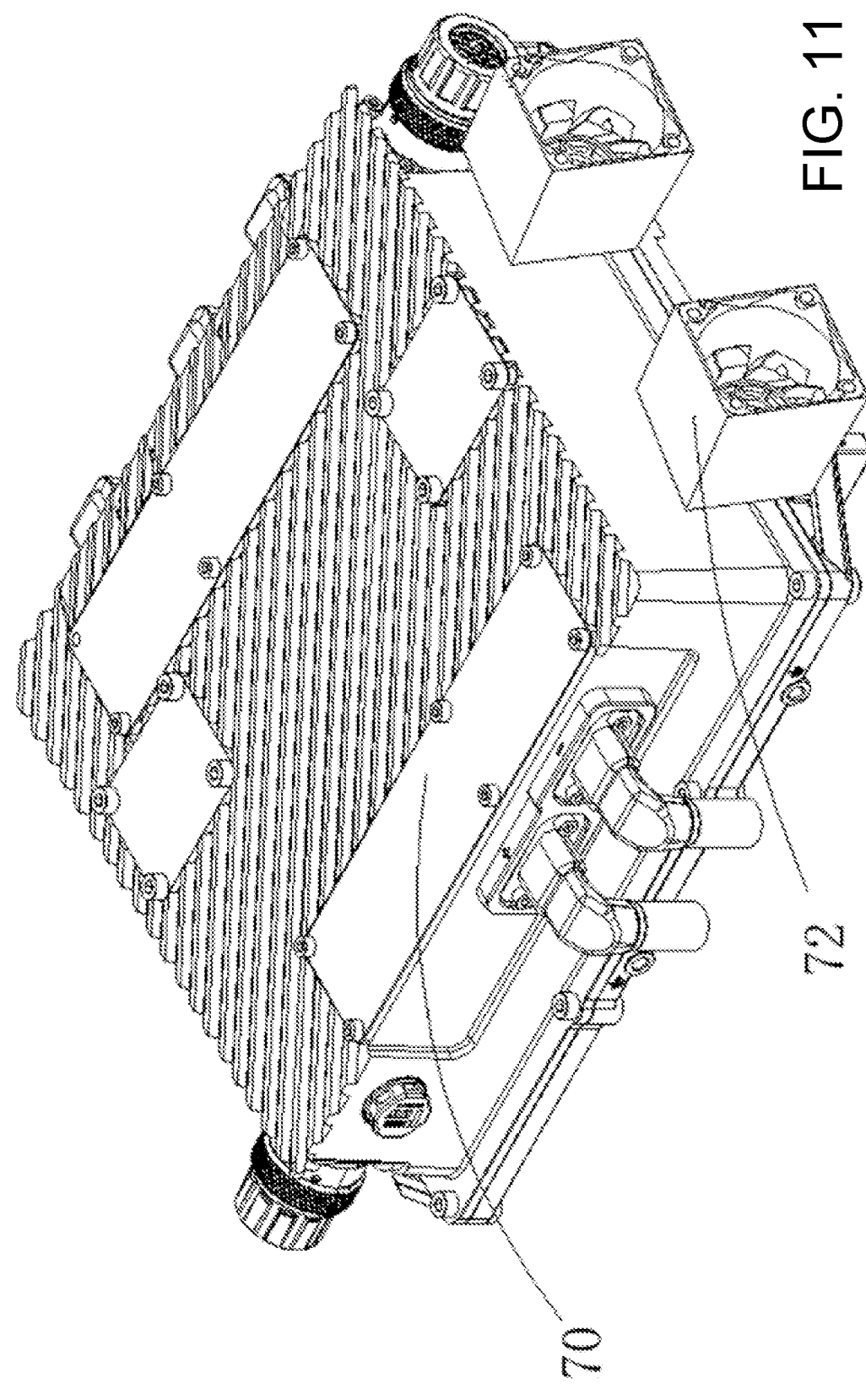
FIG. 11 is a rear, left perspective view of the controller of FIGS. 3, 8 and 10.

As best shown in FIG. 11, the preferred embodiments include at least one and more preferably a plurality of additional, smaller cooling fans 72 directed for blowing air on the controller 70. The cooling fans 72 may be mounted to the controller 70 or may be mounted at an appropriate location on the frame 20. The cooling fans 72 preferably are located at the rear of the controller 70 and blow air forwardly to avoid hot air blowing directly to the driver.

Figures 12, 13, 14:
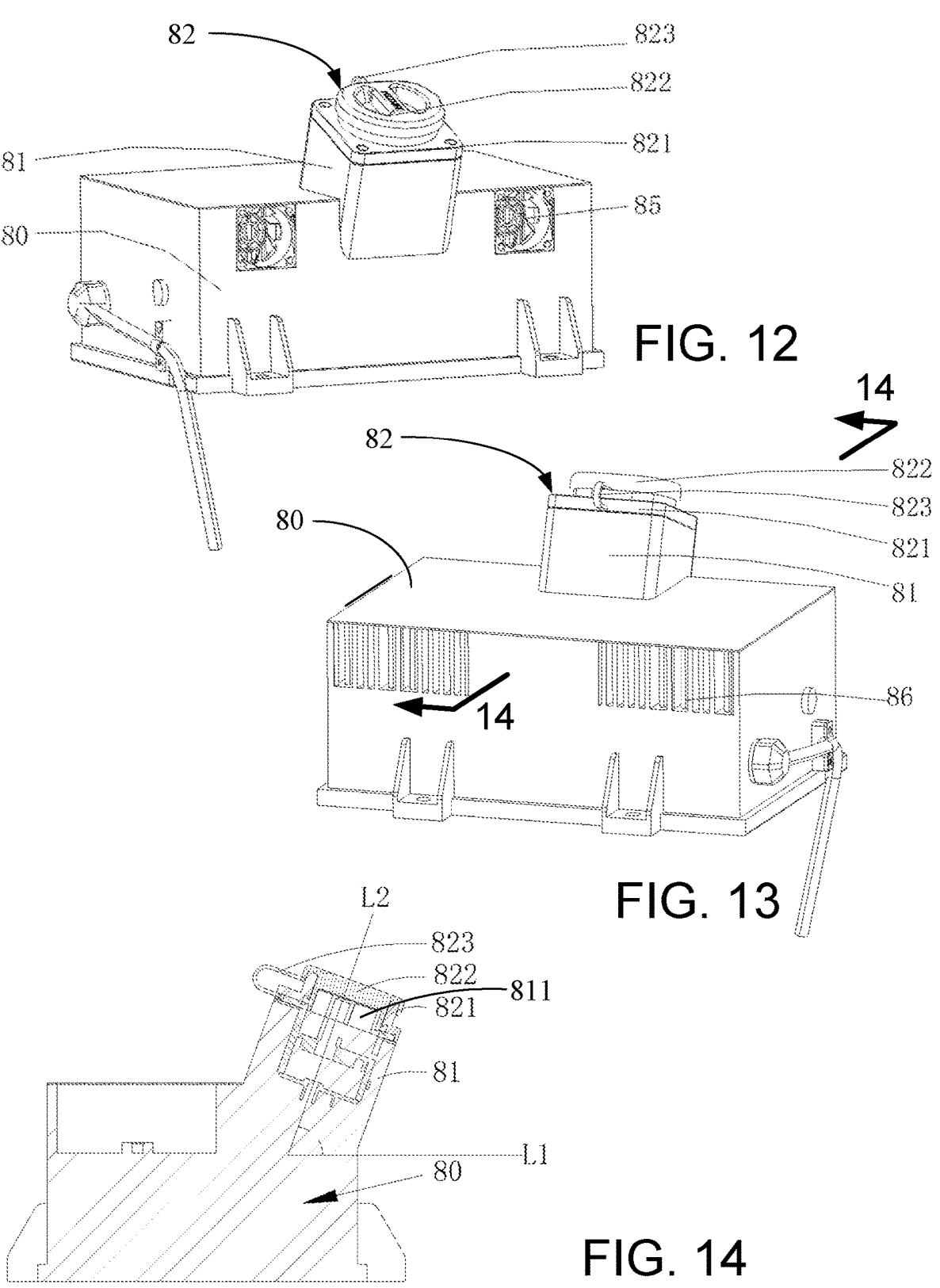
FIG. 12 is a rear, left perspective view of the charging device of FIG. 3 for the electric motorcycle.
FIG. 13 is front, left perspective view of the charging device of FIGS. 3 and 12 for the electric motorcycle.
FIG. 14 is a cross-sectional view of the charging device of FIGS. 3, 12 and 13, taken along cut line 14-14 in FIG. 13 corresponding with the longitudinal center line of the vehicle.

The charging device 80 is best shown in FIGS. 12-14. The charging device 80 has a charging connector 81 with an internal charging interface 811, which as shown in FIG. 3 preferably has its opening facing rearwardly toward the seat 13. More specifically and as shown in FIG. 14, an angle is formed between the axis L1 along the length direction of the charging connector 81 and horizontal L2, and the angle is preferably in the range from 30° to 60°.

The charging device 80 preferably includes a detachable sealing plug 82 for protecting the charging connector 81. The sealing plug 82 includes a plug body 821 and a plug cap 822 connected to the plug body 821 by a tether 823. The plug cap 822 has a ring groove on the side facing the charging connector 81, which may receive an O-ring seal. When the plug cap 822 is inserted into the plug body 821, the plug cap 822 and the plug body 821 form a seal to protect the charging connector 81 from elements such as precipitation and dust, so electrical charging connections with the charging connector 81 can be repeatedly and securely made throughout the life of the motorcycle 10.

Figure 15:
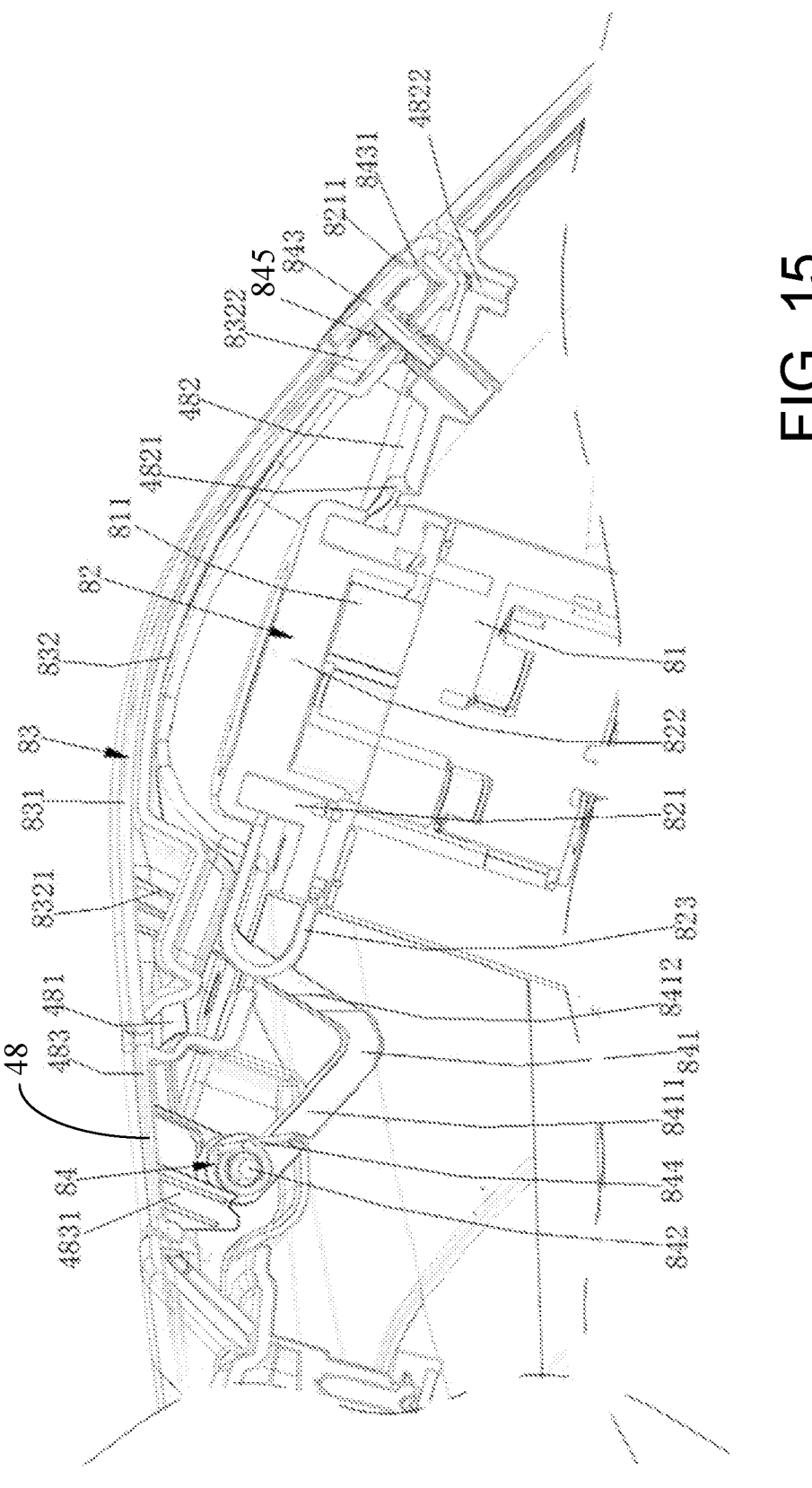
FIG. 15 is a cross-sectional view of a charging connector and a charging port cover of the electric motorcycle, taken along the longitudinal center line of the vehicle.

In the preferred embodiments, part of the vehicle cover 40 is a charging device cover 48 as called out in FIGS. 1 and 2, with additional details of the charging device cover 48 shown in FIG. 15. The charging device cover 48 defines a charging port 481 having a shape in plan view corresponding to the plan view shape of the charging connector 81. An inner end of the charging port 481 extends toward the charging connector 81, and a shutter 482 is arranged on the inner end of the charging port 481. The middle lip of the shutter 482 defines a shutter opening 4821 immediately encircling the charging connector 81. The end face of the plug body 821 away from the charging connector 81 at least partially passes through the shutter opening 4821 along the axis direction of the charging connector 81. The shutter 482 has at least one water leakage hole 4822 defined therethrough, and the water leakage hole 4822 preferably opens at the lowest point of the shutter 482 along the motorcycle height direction.

The surface of the charging connector 81 which contacts the external connector of the charging cord during charging at least partially passes through the shutter opening 4821 along the axis direction of the charging connector 81.

The vehicle cover 40 has a charging port cover mounting part 483 immediately forward of the charging connector 81. The charging port cover mounting part 483 has two shaft mounting parts 4831 extending toward the front.

A charging port cover 83 is hingedly connected to the charging port cover mounting part 483 by a hinge pin 842. The charging port cover 83 closes to conceal the charging port 481 and opens to allow access to the charging port 481. When closed, the top face of the charging port cover 83 is smoothly incorporated into the top face of the vehicle cover 40. When opened, the charging port cover 83 is turned and opened toward the dashboard panel 14.

A locking structure 84 is used to hold the charging port cover 83 closed. As called out in FIG. 15, the locking structure 84 includes a connecting rod 841, the hinge pin 842, a button 843 and a torsion spring 844. The connecting rod 841 is connected to an inner side of the charging port cover 83 and rotates on the hinge pin 842. The torsion spring 844 is arranged on the hinge pin 842, with one end of the torsion spring 844 pushing off the connecting rod 841 and the other end pushing off the vehicle cover 40. The button 843 is moveably arranged on the charging port cover 83 on an end of the charging port cover 83 toward the driver. An elastic element 845 is arranged between the button 843 and the charging port cover 83, movably attaching the button 843 to the charging port cover 83. The button 843 secures the charging port cover 83 closed, but pressing the button 843 releases the lock so the connecting rod 841 and charging port cover 83 rotate around the hinge pin 842 under the opening force of the torsion spring 844. In the preferred embodiments, the elastic element 845 is a compression spring.

The preferred connecting rod 841 includes a first segment 8411 connected to the hinge pin 842 and a second segment 8412 connected to the charging port cover 83. As measured in the view of FIG. 15, the length of the first segment 8411 is greater than or equal to the distance between the front edge of the shutter opening 4821 and the axis of the hinge pin 842. The second segment 8412 passes through the shutter opening 4821 and is connected to the charging port cover 83.

Two ends of the hinge pin 842 are rotatably arranged on the hinge pin mounting part 4831. A damping member (not shown) may be disposed on the connection between the hinge pin 842 and the vehicle cover 40.

In the preferred embodiment shown in FIG. 15, the charging port cover 83 includes a cover plate 831 and a bottom plate 832. A cavity is defined by the cover plate 831 and the bottom plate 832. A first recess 8321 is defined at a front end of the bottom plate 832 and a second recess 8322 is defined at a rear end of the bottom plate 832. The connecting rod 841 is connected to the charging port cover 82 within the first recess 8321, and the button 843 is arranged within the second recess 8322.

The cover plate 831 preferably defines a pressing hole 8211 for the button 843 to pass through. The pressing surface of the button 843 is preferably flush with the surface of the cover plate 831, or alternatively can be sunken from the surface of the cover plate 831 to the bottom plate 832. The outer edge of the button 843 is provided with a limiting convex ring 8431, which abuts against with the cover plate 831 under the thrust of the elastic element 845 to prevent dust and impurities from entering into the second recess 8322 through the gap between the pressing surface of the button 843 and the cover plate 831.

Figure 16:
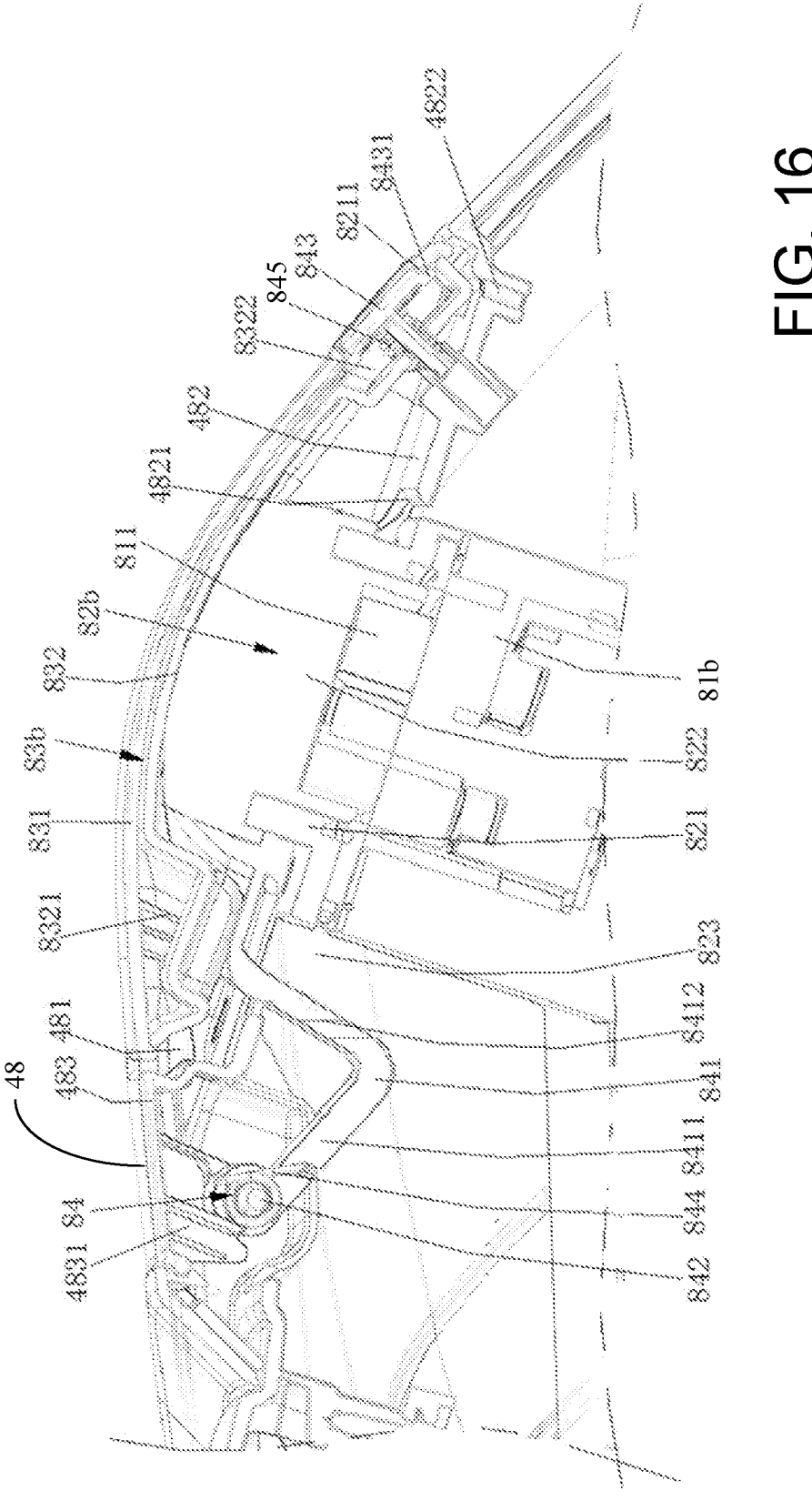
FIG. 16 is a cross-sectional view of an alternative charging connector and charging port cover of the electric motorcycle, taken along the longitudinal center line of the vehicle.

FIG. 16 shows an alternative embodiment of the charging port cover, in which the sealing plug 82*b* is a part of the charging port cover 83b. The sealing plug 82b is separated from the charging connector 81b to facilitate charging when the charging port cover 83b is opened.

In the preferred charging device 80 shown in FIGS. 12 and 13, one or more cooling fans 85 are arranged on the charging device 80. For instance, FIGS. 12 and 13 show the charging device 80 with two cooling fans 85 symmetrically arranged on the charging device 85 respective to the longitudinal centerline of the vehicle 10. The air inlet of the cooling fans 85 faces rearwardly toward the seat(s) 13, and the air outlet of the cooling fans 85 faces toward the interior of the charging device 80. The cooling fans 85 push air forwardly through the charging device 80, exiting the charging device 80 at one or more air outlets 86 oriented toward the front of the charging device 80. The cooling fans 85 cool down the charging device 80 by forced air to improve the safety of the motorcycle during charging. The air outlets 86 face toward the dashboard panel 14 to avoid hot air blowing directly at the driver.

FIG. 17 shows an alternative cooling system 71c which is connected to direct coolant through the charging device 80 rather than through either or both of the battery pack 60 and controller 70. The coolant in the coolant pipe connections 712c flows from second pipeline 7122c through the charging device 80, returning to the radiator 711 through the third pipeline 7123c. The coolant pipe connections 712c are accordingly partially arranged on the charging device 80.

In other embodiments, the cooling system can also be used to pipe coolant through one or both of the battery pack 60 and the controller 70 in addition to the charging device 80.

FIG. 18 shows an alternative cooling system 71d which is connected to direct coolant through the electric motor 50 and the controller 70 rather than through either or both of the battery pack 60 and charging device 80. The coolant in the coolant pipe connections 712d flows from second pipeline 7122d through the controller 70. A fourth branch pipe 7124d pipes coolant from the coolant outlet of the controller 70 to the coolant inlet of the motor 50. The third branch pipe 7123d then returns coolant from the coolant outlet of the electric motor 50 to the radiator 711. In other embodiments, the coolant 712d may first flow through the electric motor 50, then flow through the controller 70. In other embodiments, the coolant may additionally flow through either or both of the battery pack 60 and the charging device 80.

FIG. 19 shows a rear perspective view showing the coolant pipe connections 712d and also calls out additional elements of the auxiliary coolant tank 714. The auxiliary coolant tank 714 includes an auxiliary coolant tank body 7141, a coolant-adding channel 7142, and an auxiliary coolant tank cap 7143. The auxiliary coolant tank body 7141 can be mounted on the frame 20 such as by bolts. In other embodiments, the auxiliary coolant tank 7141 is fixed to the battery case 62, possibly on the opposite side as the radiator 711. The coolant-adding channel 7142 flows into the auxiliary coolant tank body 7141 and is a curved structure, which is convenient for adding coolant. The auxiliary coolant tank cap 7143 is detachably connected to the end of the coolant-adding channel 7142 far away from the auxiliary coolant tank body 7141 to close the auxiliary coolant tank body 7141. In a preferred embodiment, the auxiliary coolant tank cap 7143 and the auxiliary coolant tank body 7141 are connected by threads. In other embodiments, they are connected to each other with an interference fit or other connection methods.

FIG. 20 shows an alternative cooling system 71e which is connected to direct coolant through only the electric motor 50 rather than through one or more of the battery pack 60, the controller 70 and the charging device 80. The coolant in the coolant pipe connections 712e flows from second pipeline 7122e through the electric motor 50, returning to the radiator 711 through third branch pipe 7123e.

The front frame 21 called out in FIG. 4 is better shown in FIGS. 21 and 22. The front frame 21 preferably supports a plurality of front bumpers 241. For instance, four or more preferably two front bumpers 241 can be symmetrically arranged on two sides of the battery pack 60. The preferred front bumpers 241 are a straight bar type, which reduces the wind resistance of the electric motorcycle at high speed, and improves the controllability and safety of the electric motorcycle. Distal ends of the front bumpers 241 are provided with a buffer member 242 which is a compressible elastic structure. In other embodiments, the front bumpers 241 are provided with a hydraulic telescopic rod buffer structure or a pneumatic telescopic rod buffer structure.

FIG. 23 shows the internal structure of a preferred front bumper 241. Each front bumper 241 includes a tube body 2411 and a rod body 2412 in a telescoping arrangement. A cavity is defined inside the tube body 2411, and the rod body 2412 is partially inserted into the cavity. A buffer spring 2413 is also disposed within the cavity, preferably as a compression spring proximal to the rod body 2412. One end of the buffer spring 2413 is connected to the rod body 2412. The buffer member 242 is coupled to the distal or outer end of the rod body 2412.

At least two fixing rods 243 are mounted on the front frame 21 and extend downwardly. The top end of each fixing rod 243 is mounted on the front frame 21 by a connector 244, and the bottom end of each fixing rod 243 is connected to the battery case 62 such as with pegs that extend laterally inward and mate into a transverse through-hole in the front of the battery case 62. Each front bumper 241 is connected to its fixing rod 243 by a connecting block 2431, which is a part of the fixing rod 243. The fixing rods 243 and connecting blocks 2431 are symmetrically arranged on two sides of the battery case 62. Therefore, when one of the front bumpers 241 are impacted, the pressure from the front bumper 241 can be transferred to the whole frame 20 rather than to the battery pack 60.

As further shown in FIGS. 21 and 22, a battery bumper 245 for protecting the battery case 62 from front impact is mounted on the front frame 21. The battery bumper 245 includes a first bumper body 2451a, a first connector 2451b connected to the first bumper body 2451a, a second bumper body 2451c and a second connector 2451d connected to the second bumper body 2451c. The first connector 2451b and the second connector 2451d are staggered and connected by screws. The first bumper body 2451a is connected to one side of the frame 20, and the second bumper body 2451c is connected to the other side of the frame 20.

Each front bumper 241 is connected to the outer side of one of the connection blocks 2431 by screws so as to extend outwardly, and the battery bumper 245 is connected to the inner side of the connection blocks 2431 by screws so as to extend between the two connecting blocks 2431. The axis of the battery bumper 245 is preferably staggered vertically with the axis of the front bumpers 241, which improves the strength between the fixing rods 243 and prevents deformation of the fixing rods 243 due to an impact force on one of the front bumpers 241.

As best shown in FIGS. 6 and 7, the outer wall of the body case 621 is provided with a plurality of rear suspension connection lugs, including a rear fork connection lug 625a and a shock absorber connection lug 625b. Each connection lug 625*a*, 625*b* has a shaft hole. The rear suspension (including the motor 50, and as further explained below with reference to FIGS. 25 and 26) is connected to the body case 621 using the connection lug 625*a*, 625*b*.

In preferred embodiments, the side of the battery case 62 adjacent to the front wheel 11 is connected to the front frame 21, and the side of the battery housing 62 adjacent to the rear wheel 12 is connected to the rear frame 22, each by connection seats arranged on the outer wall of the battery case 62. Each connection seat is an arc-shaped bulge formed on the edge of the body case 621, and a shaft hole extends through the bulge. More particularly as shown in FIGS. 6 and 7, the preferred body case 621 has a first connection seat 624*a*, a second connection seat 624*b*, a third connection seat 624*c*, a fourth connection seat 624*d*, a fifth connection seat 624*e*, a sixth connection seat 624*f* and a seventh connection seat 624*g*. The first connection seat 624*a* is positioned at the top of the battery case 62. The second connection seat 624*b* is positioned at the side of the battery case 62 facing toward the front wheel 11. The third connection seat 624*c* is positioned at the side of the battery case 62 facing toward the rear wheel 12 and at the edge of the battery case 62. The fourth connection seat 624*d* and the fifth connection seat 624*e* are both positioned at the side of the battery housing 62 toward the rear wheel 12. Each of these connection seats includes two ear portions for connection using a shaft and hole fit. The first connection seat 624*a* and the second connection seat 624*b* are connected to the front frame 21 and the third connection seat 624*c* and the fourth connection seat 624*d* are connected to the rear frame 22. The fixing rods 243 shown in FIGS. 21 and 22 mate into the seventh connection seat 624*g*.

As shown in FIG. 1, the motorcycle 10 preferably includes a kickstand 25 having a middle brace 261 and a diagonal brace 262. As better shown in FIG. 24, the kickstand 25 includes a bracket 251 and mounting racks 252 for connection to the battery case 62. The bracket 251 is fitted with the bottom surface of the battery case 62 as shown in FIG. 5. A bending portion connected to the battery case 62 is defined by bending the two ends of the bracket 251. The bending portion is fitted with the battery case 62. One end of the bracket 251 facing toward the rear wheel 12 is hinged with the middle brace 261. Two mounting racks 252 are respectively mounted on the two sides of battery case 62. The mounting racks 252 follow the edge contour of the bending portion of the bracket 251. A leading end of each mounting rack 252 is connected to the sixth connection seat 624*f* of the battery case 62, and the trailing end is connected to the fifth connection seat 624*e* of the battery case 62. Each mounting rack 252 is provided with a diagonal brace fixing part 2521, which is arranged obliquely against the side surface of the battery case 62, and the diagonal brace fixing part 2521 is hinged with the diagonal brace 262.

The middle brace 261 and the diagonal back 262 are both hingedly connected to the mounting racks 252, and are shown in FIGS. 1-4 and 24 in both lowered and raised positions. The middle brace 261 includes two symmetrically arranged support rods 2611, one middle deflector rod 2612 and a first tension spring 2613. The support rods 2611 are arranged below the bracket 251. A reinforcing shaft 2614 is connected between the support rods 2611. The middle deflector rod 2612 is connected to one of the two support rods 2611. A connection rib 2616 is connected between the support rod 2611 and the deflector rod 2612. One end of the first tension spring 2613 is connected to the support rod 2611, and the other end is connected to the bracket 251.

The preferred diagonal brace 262 includes a diagonal brace hinge 2621, a diagonal brace 2622, and a second tension spring 2623. The diagonal brace hinge 2621 is a part of the diagonal brace 2622, one end of which is hinged with the diagonal brace fixing part 2521. The diagonal brace fixing part 2521 is inclined outwards, and the diagonal brace hinge 2621 and the diagonal brace 2622 are also inclined outwards. One end of the second tension spring 2623 is connected to the diagonal brace 2622, and the other end is connected to the bracket 251.

As shown in FIG. 4, the frame 20 is also preferably provided with an alarm light mounting seat 273. As shown in FIG. 1, an alarm lamp telescopic rod 2731 mates into the alarm light mounting seat 273. An alarm lamp 2731*a* is arranged on the alarm lamp telescopic rod 2731.

FIG. 3 (in part) and FIGS. 25 and 26 show a preferred rear suspension for the motorcycle 10. The rear suspension includes a rear fork 320. The rear fork 320 includes two symmetrically arranged support plates 321, and the electric motor 50 is preferably arranged on the rear fork 320 between two motor connection parts 3211 of the two support plates 321. The trailing end of the rear fork 320 is connected to the rear wheel 12, and the leading end supports the electric motor 50. The rear fork 320 is pivotably connected to the rear fork connection lug 625*a* of the battery case 62 by a rear fork pivot pin 323. The electric motor 50 drives the rear wheel 12 through a drive belt 124 as shown in FIGS. 1 and 27, and the drive belt 124 includes teeth (not shown) which mate into the teeth of a pulley 124. The electric motor 50 moves synchronously with the rear fork 320 of the rear suspension, so the axis of the motor 50 always remains the same distance from the axis of the rear wheel 12 regardless of suspension movement, and the tightness of the drive belt 124 remains unchanged.

As shown in FIG. 25, each support plate 321 has a rear wheel connecting part 3212 with a wheel connection slot 3212*a*. As shown in FIG. 26, the rear wheel 12 is connected to the rear fork 320 by a rear wheel axle 121 which extends through the two wheel connection slots 3212*a*. The rear wheel 12 is rotationally mounted on the rear wheel axle 121 through a bearing. The rear wheel axle 121 is secured at a desired distance from the motor 50 by tightening of two nuts on the ends of the rear wheel axle 121, thereby securing the rear wheel axle at a desired location within the two wheel connection slots 3212*a*.

As shown in FIG. 27, the drive belt 124 drives the rear wheel 12 through a toothed pulley 123 on a hub 122. One end of the drive belt 124 is received on the pulley 123, and the other end is received on the output shaft of the electric motor 50. As shown in FIG. 28, the surface of the pulley 123 is provided with a hard layer 1231, which is a part of the pulley 123 and harder than the internal metal of the pulley 123. The thickness of the hard layer 1231 is within a range of 30 μm-60 μm or more preferably within a range of 40 μm-50 μm, i.e., the thickness of the hard layer 1231 as shown in FIG. 28 is not to scale. The pulley 123 can then be designed with openings or indentations which reduce its weight, while the hard layer 1231 improves the strength of the pulley 123 and reduces its wear as it is driven by the toothed drive belt 124.

The rear suspension includes a shock absorber 322, which includes a telescoping rod 3220 and a damping spring 3221 sleeved on the telescopic rod 3220. One end of the shock absorber 322 is pivotally connected to shock absorber connection lug 125*b* of the battery case 62, and the other end is connected to the rear fork 320 using two cross beam connecting parts 3211*a* symmetrically arranged on the two support plates 321.

FIG. 29 shows a cross-sectional view through the shock absorber 322. The telescoping rod 3220 includes a sleeve 3222 and a telescopic rod body 3223. A cavity 3222*a* is defined in the sleeve 3222. One end of the damping spring 3221 is connected to the sleeve 3222, and the other end of the damping spring 3221 is connected to the telescoping rod body 3223. The telescopic rod body 3223 is capable of sliding within the cavity 3222*a*.

The telescopic rod body 3223 is provided with a shock pad 3223*a* positioned between the telescopic rod body 3223 and the sleeve 3222. The shock pad 3223*a* can further reduce the speed of the telescopic rod body moving back and forth relative to the sleeve 3222.

The shock absorber 322 preferably includes two spring stoppers 3222*b*, 3223*b*, with the first spring stopper 3222*b* secured to the sleeve 3222 and the second spring stopper 3223*b* secured to the telescoping rod body 3223. One end of the damping spring 3221 is abutted against the first spring stopper 3222*b*, and the other end is abutted against the second spring stopper 3223*b*. Damping spring 3221 is in compression between the first spring stopper 3222*b* and the second spring stopper 3223*b* to allow the suspension movement of the rear wheel 12. A spring adjusting nut 3223*c* is axially threaded to the telescoping rod body 3223 which can be rotated to adjust the steady state length and compression of the damping spring 3221.

The shock pad 3223*a* is formed of a compressible, elastic, resilient material and preferably positioned on the proximal side of the second spring stopper 3223*b*. The telescoping rod 3220 is provided with a flange gasket 3224. The flange gasket 3224 is clamped into a screw hole on the second spring stopper 3223*b* and into a screw hole on the telescopic rod body 3223. If desired, the second spring stopper 3223*b* can be provided with a damping limit groove, and the spring adjusting nut 3223*c* can be clamped into the damping limit groove.

The ends of the shock absorber 322 include rings 3222*d* and 3223*d*. One of the rings 3222*d* is pivotally secured to the shock absorber connection lug 625*b* of the battery case 62 with a pin 3222*c*, and the other ring 3223*d* is pivotally secured to the cross beam connecting parts 3211*a* of the two support plates 321 with a pin 3223*e*.

Turning back to FIGS. 25 and 26 a rear fender 324 is preferably arranged on the rear fork 320. The cross section of the rear fender 324 is arc-shaped towards the middle, and the rear fender 324 covers the rear wheel 12. The forward end of the rear fender 324 is connected to the rear fork 320, and the trailing end is suspended in midair and covers a part of the rear wheel 12. The middle of the rear fender 324 covers the rear wheel 12, and both right and left sides extend towards two right and left sides of the rear wheel 12.

A driven wheel housing 3241 that covers the pulley 123 of the rear wheel 12 is arranged below the rear fender 324. The other end is folded to form a fender connecting part 3242. The fender connecting part 3242 is connected to the cross beam connecting part 3211*a* on the two symmetrically arranged support plates 52 by screws. The rear fender 324 can prevent the mud and water rolled up by the rear wheel 12 from splashing onto the driver.

The front fairing 43 shown in FIG. 2 is preferably detachably arranged on a front strut 211 shown in FIG. 4. The middle of the front fairing 43 protrudes forwardly, and both right and left sides bend rearwardly, thus forming an arc-shaped surface on the front fairing 43. In the preferred embodiment, a headlight 152, at least two turn signal lights 153, a windscreen plate 154 and an on-board camera 159 are also mounted on the front strut 211. Rearview mirrors 156 are attached preferably on both left and right sides of the dashboard panel 14. The headlight 152 is arranged on the front fairing 43. Two of the turn signal lights 153 are symmetrically arranged on both sides of the headlight 152. The on-board camera 159 is arranged below the headlight 152, facing forwardly. The windscreen plate 154 is arranged toward the top of the front fairing 43. The contour of the windshield 154 is fitted with the contour of the front fairing 43, so that the windshield 154 forms an arc-shape similar to the front fairing 43.

The windshield 154 is connected to the front strut 211 by a lifting structure 1540, best shown in FIGS. 30 and 31, such that the windshield has a lowered position 154 and a raised position 154'. The lifting structure 1540 enables the windshield 154 to move up and down driven by the lifting structure 1540.

The preferred lifting structure 1540 includes a lifting motor 1541, a worm gear 1542, and a worm 1543 arranged between two connecting frames 1544. The output shaft of the lifting motor 1541 is connected to the worm 1543, perpendicular to the worm gear 1542 and its worm gear drive rod 1542*a*. The cross section of the preferred worm gear drive rod 1542*a* is square, and the worm gear drive rod 1542*a* is a metal straight rod rigidly connected to the worm gear 1542. Two ends of the worm gear drive rod 1542*a* are connected to the connecting frames 1544. The connecting frame 1544 includes a windshield connecting rod 1544*a*, a rotating rod 1544*b* and a windshield hinge rod 1544*c*. One end of the rotating rod 1544*b* is connected to the worm gear drive rod 1542*a*, and the other end is connected to the windshield connecting rod 1544*a*. The rotating rod 1544*b* can be driven by the worm gear drive rod 1542 to rotate. One end of the windshield hinge rod 1544*c* is rotatably connected to the front strut 211, and the other end is rotatably connected to the windshield connecting rod 1544*a*. The worm gear drive rod 1542 can drive the rotating rod 1544*b* and the hinge rod 1544*c* to rotate so as to move the windshield 154 upwardly or downwardly.

The steering system 110 controls the orientation of the front wheel 11 and includes a steering handle 111 which turns a front fork 311 as called out in FIG. 3. The steering handle 111 is shown in an exploded view in FIG. 32. A pair of a grip assemblies 112 are symmetrically arranged on both sides of the steering handle 111. The driver holds one of the grip assemblies 112 in each hand while driving.

The left grip assembly 112 preferably includes a grip switch assembly 1121 and a hand grip 1122, whereas the right grip assembly 112 includes an electronic-controlled throttle 1125. Both the hand grip 1122 and the electronic-controlled throttle 1125 are hollow, mounted in a sleeved configuration on the steering handle 111. The output power of the electric motor 50 can be increased by turning electronic-controlled throttle 1125. Each grip assembly 112 includes grip counterbalance block 1123 and a thread insert 1124 arranged on two ends of the steering handle 111. An axial through hole is defined in the grip counterbalance block 1123. The thread insert 1124 is inserted into the through hole and abutted against the grip counterbalance block 1123, so as to fix the hand grip 1122 and the electronic-controlled throttle 1125 on the steering handle 111.

A plurality of buttons are arranged in different areas of the switch assembly 1121, the orientation of which is shown in the end view of FIG. 33 looking down the axis of the steering handle 111. The switch assembly 1121 has a first operation area in the three-o'clock to four-thirty area, a second operation area in the one-thirty to three o'clock area, a third operation area in the twelve o'clock to one-thirty area, and a fourth operation area in the ten-thirty to twelve o'clock area.

As shown in FIGS. 33-35, a horn button 1121a and a turn signal light button 1121b are located in the first operation area. A power assisted pushing button 1121c and a shift button 1121d are located in the second operation area. The power assisted pushing button 1121c can realize the switching of forward gear and backward gear mainly by controlling the switching of forward and reverse rotation of electric motor 50. A multi-function button, a loudspeaker button 1121g, and a loudspeaker circular broadcast button 1121j are located in the third operation area. A high and low beam light on/off button 1121h is located in the fourth operation area.

In preferred embodiments, the multi-function button includes a lifting button 1121e and a switching button 1121f. The lifting button 1121e is provided with a concave portion. The switching button 1121f is partially inserted into the concave portion after the switching button moves toward the steering handle. The lifting button 1121e is capable of controlling lifting of the windshield 154 when the switching button 1121f is inserted into the concave portion. The windshield 154 can be raised and lowered according to different driving scenarios. The lifting button 1121e is capable of controlling lifting of the alarm light when the switching button 1121f is detached from the concave portion. Alternatively, in other embodiments, the lifting button 1121e is capable of controlling the lifting of the alarm lights when the switching button 1121f is inserted into the concave portion. The buttons with different frequency of use are arranged in different areas, which can increase the convenience of operation and facilitate the driver to remember the positions of buttons with different functions.

In preferred embodiments, the first operation area is also provided with a photographing button 1121i for controlling the on-board camera 159. The on-board camera 159 is configured to capture photos during cruise.

As shown in FIGS. 1 and 2, the vehicle cover 40 preferably covers most of the electric motorcycle 10. Gaps are defined between various components on the vehicle cover 40 to provide air flow to the inner wall of the vehicle cover 40, thereby cooling various components covered by the vehicle cover 40. The vehicle cover 40 includes two side covers 41, two upper cowlings 42, a front fairing 43, two battery covers 44, two lower fairings 45, a front fender 46, a front shield 47, a charging device cover 48 and two rear fork covers 49. Gaps are defined between various components on the vehicle cover 40 to provide air flow to the interior of the vehicle cover 40, thereby cooling various components covered by the vehicle cover 40. The charging device cover 48 covers the charging device 80. The battery covers 44 are wrapped on the outside of the battery case 62, and the upper cowling 42 is positioned between the charging device cover 48 and the battery cover 44 as well as rearward of the battery cover 44. A front end of the battery cover 44 fits the side cover 41, and the other end fits the lower fairing 45. The front shields 47 are arranged between the front wheel 11 and the power battery 60. The front shields 47 are provided with a vent for air. The rear fork cover 49 covers the pivoting area of the rear suspension.

FIG. 36 shows an exploded view of the rear fork covers 49 each including one or two foot pegs 491. The foot pegs 491 are preferably provided with anti-skid grooves such as in a resilient an upper foot peg insert 4911 positioned within a rigid lower foot peg housing 4912. The anti-skid groove is arranged on the upper foot peg insert 4911, and the lower foot peg housing 4912 is connected to the rear fork cover 49.

The preferred foot pegs 491 are inclined to the rear fork cover 49. The foot pegs 491 each include a foot peg connecting block 4913, which is connected to the rear fork cover 49. The rear fork covers 49 define plurality of peg connecting slots 4914, and at least one peg connecting slot 4914 has an inclined inner wall. The peg connecting block 4913 is closely fitted with the side wall of the front peg connecting slot 4914.

The foot peg connecting block 4913 and the front foot peg connecting slot 4914 are both provided with a concentrically arranged foot peg connecting through hole. A foot peg connecting shaft 4915 is inserted into the foot peg connecting through hole. The foot peg connecting shaft 4915 is sleeved with a foot peg reset member 4916. The foot peg reset part 4916 is a torsion spring, and an inclination angle of the foot peg 491 can be varied by pressing against the torsion spring force.

FIGS. 37-41 show the preferred construction of the two rear side boxes 91. Each rear side box 91 includes a box body 911 and a box cap 912. The two rear side-boxes 91 are respectively arranged at two sides of the electric motorcycle 10. The box body 911 is preferably colored and finished to match the vehicle cover 40. The frame 20 supports a rear tail cover/center guard plate, which is a part of the vehicle cover 40. The box body 911 mates into the rear tail cover/center guard plate.

As shown in the exploded view of FIG. 39, the box body 911 includes a side-box cap 911a and a side-box liner 911b. The side-box inner 911b is placed inside the side-box cap 911a, and the contour of the side box inner 911b is fitted with the contour of the side-box cap 911a. The side-box cover 912 includes a side-box top cover 912c, a side-box cover inner plate 912b and a side-box cover cap 912a fitted with each other. The side-box cover inner plate 912b is positioned between the side-box top cover 912c and the side-box cover cap 912a.

The box cover 912 is movably connected to the box body 911. For instance, the preferred box cap 912 is hinged to the box body 911 by a rear side-box hinge 913, locked by a locking structure 914 on an opposite side to the hinge 913. The distance from the central point of the rear wheel 12 to the rear side-box hinge 913 is less than the distance from the central point of the rear wheel 12 to the locking structure 914.

The box body 911 is provided with a box cover puller 915 shown in FIG. 41. One end of the box cover puller 915 is hinged with the box body 911, and the other end is hinged with the box cover 912. When the box cover 912 is opened and turned toward the ground, the box cover puller 915 will pull the box cover 912. A rear side-box containing cavity is defined on the box 911. An annular bulge 916 called out in FIG. 40 is formed along the circumferential wall of the rear side box containing cavity. The side-box cover 912 covers the annular bulge 916. The rear side-box hinges 913 and the side-box cover puller 915 are all arranged on the annular bulge 916. The locking member 914 is arranged on the annular bulge 916. As shown in FIG. 41, the locking member 914 includes a drive member 9141, a plurality of locking members 9142, and a corresponding number of locating member 9143.

Each locating member 9143 has a side-box locating opening with a locked position 9143a and a release position 9143b. The locking members 9142 are connected to the drive member 9141 by a connecting link 9144 which extends around the annular bulge 256. The drive member 9141 drives the locating member connecting piece 9144 to move back and forth which drives the locking members 9142 to move back and forth between the locked position 9143*a* and the release position 9143*b*. The box cap 912 can thus be released and opened from the box body 911 by hand movement of the drive member 9141.

Turning back to FIGS. 1-5, the electric motorcycle 10 includes at least two rear bumpers 27 symmetrically connected at two sides to the frame 20. The two rear bumpers 27 are connected to each other by a rear bumper connection rod 28.

The width of the two rear bumpers 27 is greater than the width of the two side box assemblies 91. The rear bumper 27 has a rear bumper buffer structure formed by a rear bumper buffer pad 272 at the end of each rear bumper 27. The rear bumper buffer pad 272 is preferably formed of rubber to protect the rear bumper body and side boxes 91 in case of side or rear impact.

The preferred embodiments have a trunk assembly 92 best shown in FIGS. 1, 2, 42 and 43. The trunk assembly 92 includes a trunk body 921 and a trunk cover hinged to the trunk body 921 by a trunk cover hinge 923. A trunk storage chamber for containing articles is defined in the trunk body 921. A trunk boss is formed by extending the circumferential wall of the trunk body 921 toward the axis of the trunk body 921. The trunk cover hinge 923 is arranged on the trunk boss.

The trunk cover hinge 923 includes an articulated ring sleeve 9231. The trunk body 921 is provided with a trunk articulated shaft 9211 on which the articulated ring sleeve 9231 is sleeved. The trunk cover hinge 923 is also connected to the trunk cover.

As called out in FIGS. 2 and 42, right and left sides of the trunk 92 preferably include a trunk clearance lamp 926, which can reflect light. The trunk 92 is also provided with a trunk backrest 927 connected on the side of the trunk 92 facing the back of the rider. The trunk backrest 927 is concave toward the rider.

The trunk assembly 92 may also be removable, to be replaced with a rear seat (not shown) and a rear seat backrest assembly 931 shown in FIGS. 44 and 45. The rear seat backrest assembly 931 includes a backrest cushion 9311 supported by a backrest bracket 9312. The backrest bracket 9312 includes armrests 9313 and a backrest cushion bracket 9314 and is connected to the rear frame 22. The backrest cushion 9311 is connected to the backrest cushion bracket 9314 using a backrest cushion connecting plate 9311*a* and a backrest trim cover 9314*a*.

Any embodiment disclosed in this application can be used as an independent technical solution or combined with other embodiments. The terms and expressions used here are descriptive only of preferred embodiments, without limitation, and there is no intention to indicate that these terms and expressions exclude any equivalent structures. Appropriate changes or modifications can be made within the scope of this application and claims, and any person skilled in the art can make some changes and changes according to the essence described in the application. These changes and changes are also considered to fall within the scope of the application and the scope limited by independent claims and ancillary claims.

What is claimed is:
1. An electric motorcycle comprising:
a frame;
a front wheel;
a rear wheel having a rear wheel axis of rotation;
a seat arranged on the frame;

a vehicle cover arranged on the frame;
a dashboard panel arranged on the frame;
a controller;
a suspension system comprising a front suspension and a rear suspension, the front wheel being connected to the frame by the front suspension, and the rear wheel being connected to the frame by the rear suspension;
an electric motor, at least one of the front wheel and the rear wheel being connected to the electric motor, the electric motor having an electric motor rotation axis;
a battery pack arranged on the frame, the battery pack being electrically connected to the electric motor; and
a charging device arranged on the frame and electrically connected to the battery pack;
wherein the battery pack, the controller and the charging device are arranged in sequence along a height direction of the frame, the battery pack and the charging device are positioned on the frame adjacent to the front wheel, and the controller is arranged on the battery pack;
wherein the rear suspension comprises a rear fork and a shock absorber connected to the frame by a shaft, the rear fork is connected to the rear wheel, and the electric motor is arranged on the rear fork spaced from the rear wheel axis of rotation such that the electric motor rotation axis always remains a same distance from the rear wheel axis of rotation regardless of suspension movement.

2. The electric motorcycle of claim 1, wherein the battery pack comprises a battery and a battery case, the battery is arranged within the battery case, and the battery case is connected to the frame;
and wherein the frame comprises a front frame adjacent to the front wheel and a rear frame adjacent to the rear wheel, the side of the battery case adjacent to the front wheel is connected to the front frame, and the side of the battery case adjacent to the rear wheel is connected to the rear frame.

3. The electric motorcycle of claim 2, wherein the battery case comprises a body case and a plurality of side plates fixed on the body case by bolts;
wherein a bottom of the battery case is provided with a plurality of indentations, a cushion block is arranged between two adjacent indentations, and an upper end surface of the cushion block is flat with an upper end surface of the indentations.

4. The electric motorcycle of claim 2, wherein a front side of the battery case is provided with a first connection seat and a second connection seat, and a rear side of the battery case is provided with a third connection seat and a fourth connection seat, wherein the first connection seat and the second connection seat are connected to the front frame by shafts, and the third connection seat and the fourth connection seat are connected to the rear frame by shafts.

5. The electric motorcycle of claim 1, wherein the electric motorcycle defines a cooling air passage for cooling the battery pack;
and wherein the cooling air passage is a passage formed around the battery pack within a space between the vehicle cover and the battery pack.

6. The electric motorcycle of claim 2, wherein the controller is positioned at a top end of the battery case;
and wherein the battery case comprises an installation portion defining a groove in which the controller is installed, and the controller is fixed on the battery case by screws.

7. The electric motorcycle of claim 1, wherein a cooling device for cooling the controller is arranged on the frame, the cooling device comprises a radiator, a coolant pipe in fluid communication with the radiator and a pump body in fluid communication with the coolant pipe, and the coolant pipe is at least partially arranged on the controller.

8. The electric motorcycle of claim 7, wherein the controller is provided with a controller-coolant channel having an inlet and an outlet; the coolant pipe comprises a first branch pipe running from an outlet of the radiator to an inlet of the pump body, a second branch pipe running from an outlet of the pump body to the inlet of the controller-coolant channel and a third branch pipe receiving coolant from the outlet of the controller-coolant channel.

9. The electric motorcycle of claim 8, wherein the electric motor is provided with an electric motor-coolant channel having an inlet and an outlet; the coolant pipe further comprises a fourth branch pipe running from the outlet of the electric motor-coolant channel to an inlet of the radiator, with the third branch pipe providing coolant to the inlet of the electric motor-coolant channel.

10. The electric motorcycle of claim 8, wherein a plurality of cooling fins are arranged on a side wall of the radiator.

11. The electric motorcycle of claim 8, wherein the cooling device further comprises a plurality of cooling fans for blowing air against the radiator.

12. The electric motorcycle of claim 7, wherein the cooling device further comprises an auxiliary coolant tank arranged on the frame, the auxiliary coolant tank is in fluid communication with the radiator by a pipeline, and coolant is drawn from the auxiliary coolant tank into the radiator through negative pressure.

13. The electric motorcycle of claim 1, wherein the controller is connected to the electric motor by cables.

14. The electric motorcycle of claim 1, wherein the charging device is arranged on the frame, and the controller is positioned between the charging device and the battery pack.

15. The electric motorcycle of claim 1, wherein the charging device is provided with a charging connector, the charging connector is provided with a charging interface, and an opening of the charging interface faces toward the seat.

16. The electric motorcycle of claim 15, wherein the charging connector is provided with a detachable sealing plug.

17. The electric motorcycle of claim 16, wherein the sealing plug comprises a plug body and a plug cap connected to the plug body by a tether.

18. The electric motorcycle of claim 16, wherein a charging port corresponding to the charging connector is arranged on the vehicle cover, and the vehicle cover is connected to a charging port cover for closing the charging port;

wherein the end face of the charging port cover is smoothly incorporated to the vehicle cover;

wherein the charging port cover is connected to the vehicle cover by a locking structure, and the charging port cover is hinged so as to be openable toward a dashboard panel.

19. The electric motorcycle of claim 1, wherein an angle between an axis of the charging connector and horizontal is in the range from 30° to 60°.

20. An electric motorcycle comprising:

a frame;

a front wheel;

a rear wheel;

a seat arranged on the frame;

a vehicle cover arranged on the frame;

a dashboard panel arranged on the frame;

a controller;

a suspension system comprising a front suspension and a rear suspension, the front wheel being connected to the frame by the front suspension, and the rear wheel being connected to the frame by the rear suspension;

an electric motor, at least one of the front wheel and the rear wheel being connected to the electric motor;

a battery pack arranged on the frame, the battery pack being electrically connected to the electric motor; and a charging device arranged on the frame and electrically connected to the battery pack;

wherein the battery pack, the controller and the charging device are arranged in sequence along a height direction of the frame, the battery pack and the charging device are positioned on the frame adjacent to the front wheel, and the controller is arranged on the battery pack;

wherein the rear suspension comprises a rear fork and a shock absorber connected to the frame by a shaft, the rear fork is connected to the rear wheel, and the electric motor is arranged on the rear fork;

wherein the frame comprises:

a front frame adjacent to the front wheel;

a rear frame adjacent to the rear wheel; and a reinforcement bracket having a leading end connected to the front frame and a trailing end connected to the rear frame;

wherein the charging device is arranged on the reinforcement bracket;

wherein the reinforcement bracket comprises two reinforcement rods symmetrically arranged and a transverse brace rod connecting the two reinforcement rods;

wherein each reinforcement rod comprises a longitudinal reinforcement rod body part and a vertical reinforcement rod body part connected by a bent rod part; and wherein each longitudinal reinforcement rod body part has its leading end connected to the front frame, and each vertical reinforcement rod body part has its lower end connected to the rear frame by a connecting rod part.

\* \* \* \* \*